(12) United States Patent
Watanabe et al.

(10) Patent No.: US 7,454,582 B2
(45) Date of Patent: Nov. 18, 2008

(54) INITIAL COPY SYSTEM

(75) Inventors: Yasuo Watanabe, Kanagawa (JP);
Takashige Iwamura, Kanagawa (JP);
Shunji Kawamura, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 340 days.

(21) Appl. No.: 11/181,846

(22) Filed: Jul. 15, 2005

(65) Prior Publication Data

US 2006/0277376 A1    Dec. 7, 2006

(30) Foreign Application Priority Data

Jun. 1, 2005    (JP)    ............................. 2005-161222

(51) Int. Cl.
*G06F 12/16* (2006.01)
(52) U.S. Cl. ....................... 711/162; 707/204
(58) Field of Classification Search .................. 711/162
See application file for complete search history.

(56) References Cited

U.S. PATENT DOCUMENTS 6,728,849 B2 *    4/2004    Kodama ...................... 711/162

2003/0014534 A1    1/2003    Watanabe et al.
2003/0088720 A1    5/2003    Fukuzawa et al.

FOREIGN PATENT DOCUMENTS

JP    10-283272    10/1998
JP    2003-099309    4/2003

* cited by examiner

*Primary Examiner*—Gary J Portka
(74) *Attorney, Agent, or Firm*—Mattingly, Stanger, Malur & Brundidge, P.C.

(57) ABSTRACT

A storage apparatus installed in a first site generates a snapshot of a copy source logical device in an intermediate logical device. Next, an external storage apparatus including a logical device corresponding to the intermediate logical device is disconnected from the first site and connected to the second site. A storage apparatus in the second site is made to recognize the logical device in the external storage device as a logical device of a remote copy target. Next, the storage apparatus instructs the second site about writing in the copy target logical device through a global network on the basis of the difference data managed with the bit map.

20 Claims, 16 Drawing Sheets

FIG.3

130 PHYSICAL DEVICE MANAGING INFORMATION

| PHYSICAL DEVICE NUMBER | CORRESPONDING LOGICAL DEVICE NUMBER | SIZE | RAID STRUCTURE (RAID LEVEL, DATA/NO. OF PARITY) | STRIPE SIZE | DISK DRIVE NUMBER LIST | INTRA-DISK-DRIVE START OFFSET | INTRA-DISK SIZE |
|---|---|---|---|---|---|---|---|
| d1 | d2 | d3 | d4 | d5 | d6 | d7 | d8 |
| 1 | 1 | 10GB | RAID1, 1D+1P | 64KB | 1,2 | 0 | 10GB |
| 2 | 2 | 10GB | RAID1, 1D+1P | 64KB | 3,4 | 0 | 10GB |
| ... | ... | ... | ... | ... | ... | ... | ... |

FIG.4

131 LOGICAL DEVICE MANAGING INFORMATION

| LOGICAL DEVICE NUMBER (d10) | SIZE (d11) | COPY FUNCTION STATUS (d12) | SNAPSHOT PAIR MANAGING INFORMATION (d13) | REMOTE COPY PAIR MANAGING INFORMATION (d14) | FIRST DIFFERENCE BIT MAP (d15) | SECOND DIFFERENCE BIT MAP (d16) | COPY PROGRESS POINTER (d17) | BIT MAP COPY PROGRESS POINTER (d18) | DEVICE KIND INFORMATION (d19) | CORRESPONDING PHYSICAL/EXTERNAL DEVICE (d20) | PORT NO./TARGET ID/LUN (d21) | CONNECTED HOST COMPUTER NAME (d22) |
|---|---|---|---|---|---|---|---|---|---|---|---|---|
| 1 | 10GB | SNAPSHOT | 1 COPY SOURCE | NO DEFINITION | 00000... | NO DEFINITION | NO DEFINITION | NO DEFINITION | PHYSICAL DEVICE | 1 | 1/1/1 | HOST A |
| 2 | 10GB | SNAPSHOT | 1 COPY SOURCE | NO DEFINITION | 00000... | NO DEFINITION | NO DEFINITION | NO DEFINITION | PHYSICAL DEVICE | 2 | 1/1/2 | HOST A |
| 3 | 10GB | SNAPSHOT | NO DEFINITION | 2 COPY SOURCE | NO DEFINITION | 00000... | NO DEFINITION | NO DEFINITION | PHYSICAL DEVICE | 1 | 1/1/3 | HOST A |
| ... | ... | ... | ... | ... | ... | ... | ... | ... | ... | ... | ... | ... |

FIG.5

132 LU PATH MANAGING INFORMATION

| PORT NO./TARGET ID /LUN (d23) | CORRESPONDING LOGICAL DEVICE NO. (d24) | CONNECTED HOST COMPUTER NAME (d25) |
|---|---|---|
| 1/1/1 | 1 | HOST A |
| 1/1/2 | 2 | HOST A |
| 1/1/3 | 3 | HOST A |
| ⋮ | ⋮ | ⋮ |

FIG.6

133 EXTERNAL DEVICE MANAGING INFORMATION

| EXTERNAL DEVICE NO. (d30) | CORRESPONDING LOGICAL DEVICE NO. (d31) | SIZE (d32) | STORAGE IDENTIFYING INFORMATION (d33) | INTRA-EXTERNAL-STORAGE DEVICE NO. (d34) |
|---|---|---|---|---|
| 1 | 3 | 10GB | X CO.,PRODUCT NO.123 | 1/1/1 |
| 2 | 4 | 10GB | X CO.,PRODUCT NO.123 | 1/1/2 |
| ⋮ | ⋮ | ⋮ | ⋮ | ⋮ |

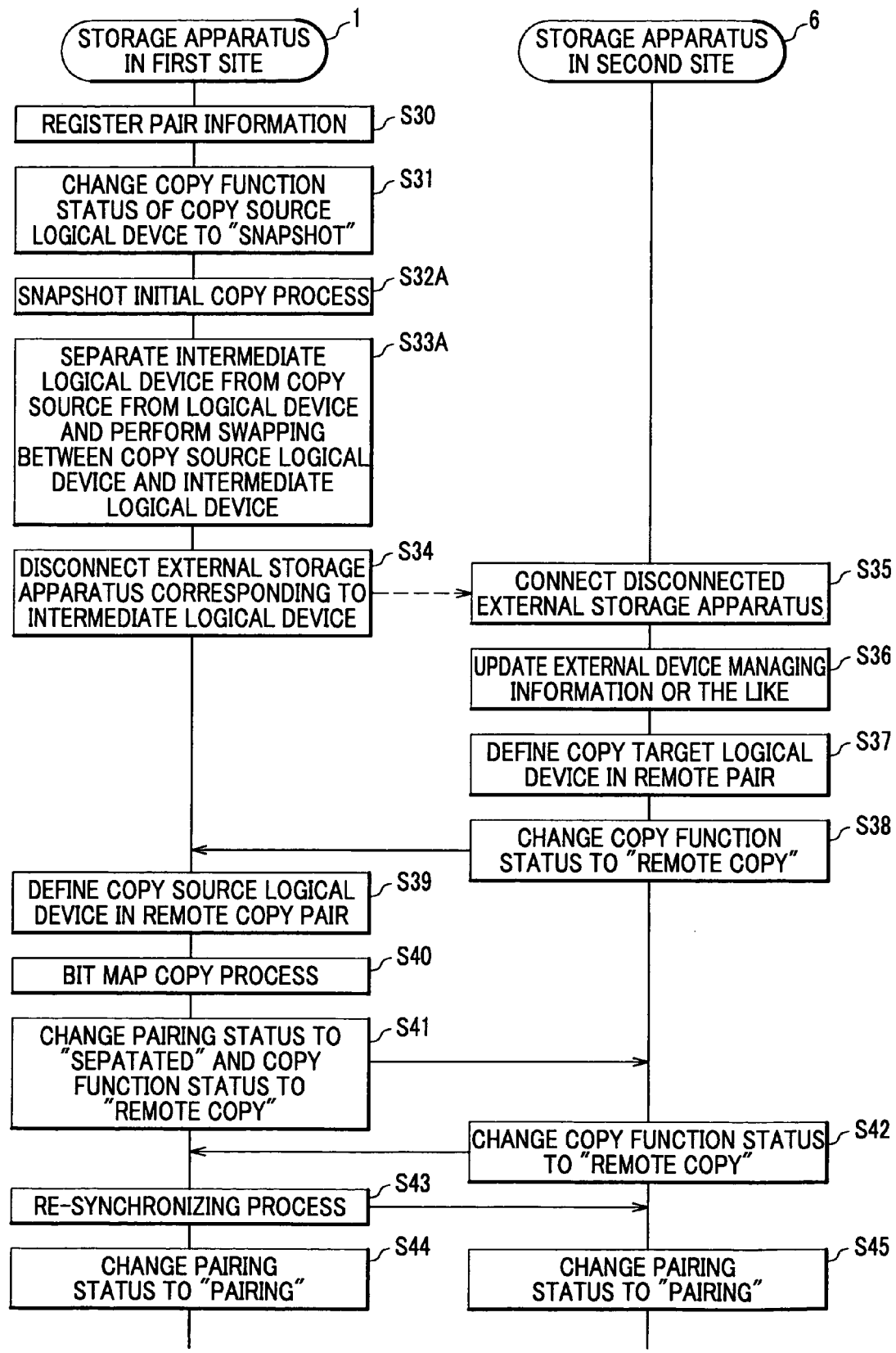

INITIAL COPY SYSTEM

CROSS REFERENCE TO RELATED APPLICATIONS

This application is related to Japanese Patent application No. 2005-161222, filed Jun. 1, 2005, which is incorporated herein by reference.

BACKGROUND OF THE INVENTION

1. Field of the Invention

The present invention relates to an initial copy system for remotely copying data.

2. Description of the Related Art

Disaster recovery for protection of data in a storage system upon trouble and disaster is known as a backup technology.

Remote copy is used for the disaster recovery in which data is duplicated in a logical device in a storage system installed in a main site and the duplicated data is recorded in a logical device in another storage system installed at a remote site. More specifically, in remote copy, there is provided target volumes of a copy in a regular storage apparatus of a copy source and a sub-storage apparatus of a copy target. Then, the data in a regular logical device in the regular storage apparatus is continuously copied in a sub-logical device of the sub-storage apparatus so as to make the data in the regular logical device coincident with that in the sub-logical device in the sub-storage apparatus.

Use of the remote copy preferably provides data in storage apparatuses at respective places collected in the storage system in a data center in a real-time manner. Here, a pair of the regular logical device and the sub-logical device are referred to as a remote copy pair. Generation of the remote copy pair requires copying all data in the regular logical device into the sub-logical device. This operation is referred to as initial copy.

Conventionally, the initial copy was done by forwarding the data of a remote copy target in the regular storage system to the sub-storage system through a network. In this method, there is a problem that completion of the initial copy requires an extremely long duration if an amount of data of an initial copy target is large or a band of the network is small.

Japanese laid-open patent application publication No. 15-99309 (2003-99309) discloses the following methods to efficiently perform the initial copy.

In the first method, the regular storage apparatus and the sub-storage apparatus are located at the same site, and the initial copy is performed with a high speed network used for short distance communication, and then, the sub-storage apparatus is moved to a remote site after completion of the initial copy. In the second method, the data in the regular storage apparatus is copied in a recording medium (such as a magnetic recording tape), which is moved to the remote site where the data is copied from the recording medium in the sub-storage apparatus. In the third method, the data stored in one or more disk units (first disk unit group) in the regular storage apparatus is copied in another one or more disk units (second disk unit group), and then, the second disk unit group is removed from the regular storage apparatus and moved to a remote site to install the second disk unit group in a sub-storage unit.

Japanese laid-open patent application publication No. 10-283272 discloses technology in which to a first storage apparatus is connected a second storage apparatus, and if a device that is a target of a read/write request received by the first storage apparatus from a host computer has correspondence with the second storage apparatus, the read/write request is done by transmitting the read/write request from the first storage apparatus to the second storage apparatus.

Increase in need for disaster recovery may increase demands for collecting data such that data in logical devices in regular storage apparatuses arranged at a plurality of sites of an enterprise are duplicated by the remote copy in logical devices in a sub-storage apparatus arranged in a site (data center). However, the technology disclosed in Japanese laid-open patent application publication No. 15-99309 may show a problem that it is difficult to improve the efficiency in the initial copy for remote copying.

SUMMARY OF THE INVENTION

An aspect of the present invention provides an initial copy system for remote copy, comprising: a plurality of computer systems at a plurality of sites include external devices and storage apparatuses coupled to the external devices, respectively, the storage apparatuses at a plurality of sites being coupled to each other through a communication network, data in a first storage apparatus of the storage apparatuses at a first site of the sites being remotely copied in a second storage apparatus of the storage apparatuses at a second site of the sites; and a third storage apparatus first coupled to the first storage apparatus in the first site, wherein the first and second storage apparatuses each comprise a logical device including a plurality of disk drives and a control unit, wherein the control unit of the first storage apparatus generates a snapshot of the logical device of the disk drives of the first storage apparatus in the logical device of the third storage apparatus and recognizes the logical device in the third storage apparatus as its own logical device, wherein the control unit in the first storage apparatus generates and manages a bit map indicating difference data between copy target data derived from the snapshot and the updated data of the copy target data when the third storage apparatus is disconnected from the first storage apparatus, and wherein the control unit in the second storage apparatus recognizes the logical device in the third storage apparatus as a copy target of the remote copy when the third storage apparatus is disconnected from the first storage apparatus in the first site and connected to the second storage apparatus in the second site, and then, instructs the control unit of the second storage apparatus about writing on the basis of the difference data in the bit map transmitted through the communication network in the logical device recognized by the second storage apparatus so as to accord the data in the second storage apparatus with the data in the first storage apparatus.

BRIEF DESCRIPTION OF THE DRAWINGS

The object and features of the present invention will become more readily apparent from the following detailed description taken in conjunction with the accompanying drawings in which:

FIG. 3 illustrates physical device managing information in the storage apparatus shown in FIG. 1;

FIG. 4 illustrates logical device managing information in the storage apparatus shown in FIG. 1;

FIG. 5 illustrates LU path managing information in the storage apparatus shown in FIG. 1;

FIG. 6 illustrates external device managing information in the storage apparatus shown in FIG. 1;

FIG. 20 is a flow chart of the remote copy including an initial copy process according to the second embodiment.

The same or corresponding elements or parts are designated with like references throughout the drawings.

DETAILED DESCRIPTION OF THE INVENTION

First Embodiment

Figure 1:
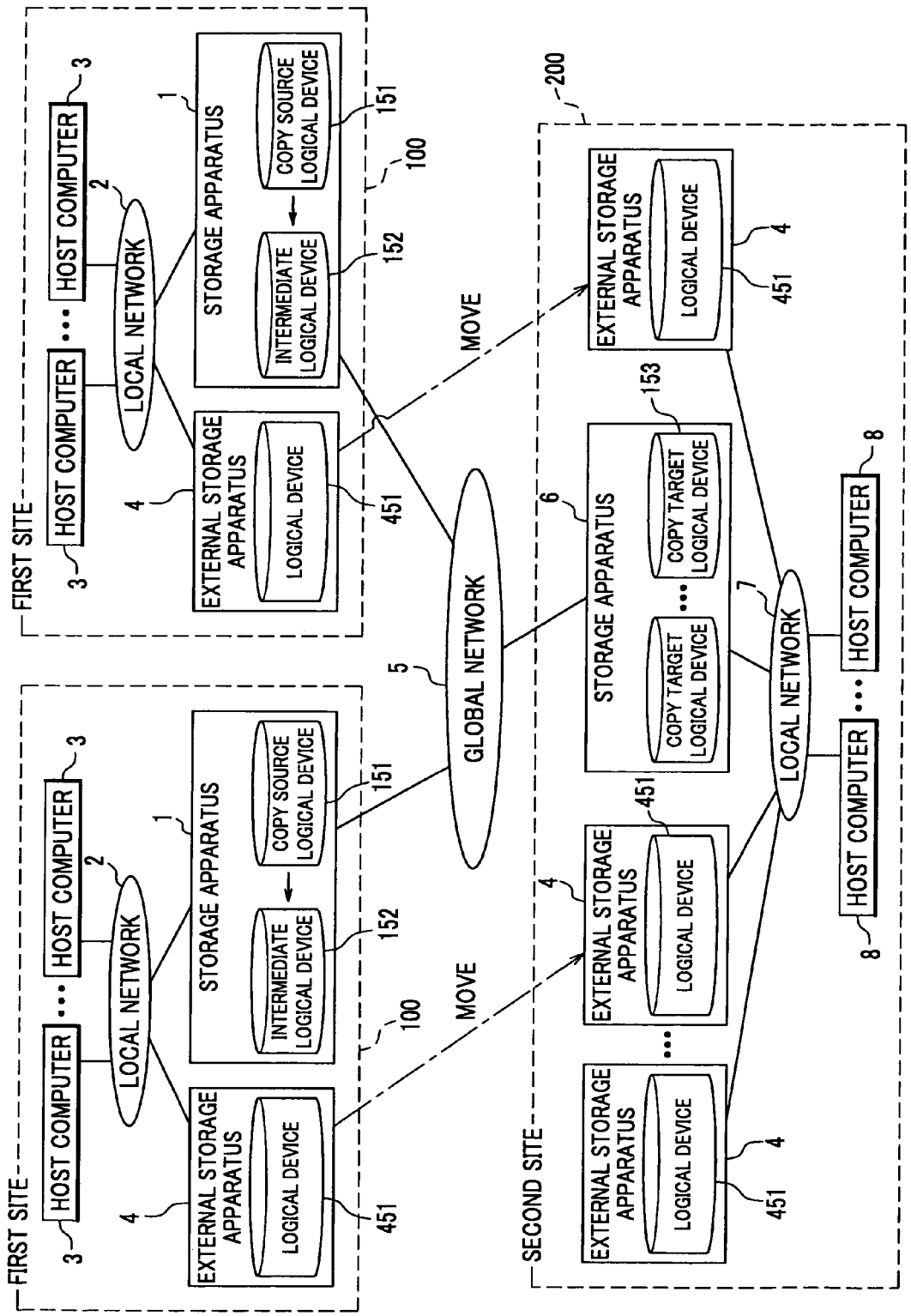
FIG. 1 is a block diagram illustrating an example of structure of a remote copy system according to a first embodiment.

FIG. 1 shows a configuration example of a remote copy system according to an embodiment of the present invention.

In FIG. 1, a computer system 100 is installed at each of first sites, and a computer system 200 is installed at a second site. Because the computer system 100 in each first site has the same structure, thus only one computer system 100 will be described.

In the computer system 100, a storage unit 1 is coupled to a plurality of host computers (external apparatus) 3 through a local network 2. The local network 2 is configured, for example, with LAN (Local Area Network) or SAN (Storage Area Network). Further, the storage apparatuses 1 are coupled to a storage apparatus 6 in the second site mentioned later through a global network (communication network) 5. As the global network 5 it is assumed that, for example, a public network is used. However, the global network 5 is not limited to this.

In the storage apparatus 1 are formed a copy source logical device 151 and an intermediate logical device 152. These devices 151 and 152 mean regions, respectively, which are derived by logically dividing a RAID (Redundant Arrays of Independent Disks) group configured with a plurality of hard disc drives. The regions are recognized as individual devices by the host computer 3, respectively.

The copy source logical device 151 is used for storing data of a copy source. The intermediate logical device 152 is a virtual logical device used for recognizing a logical device 451 of an external storage apparatus 4 as its own logical device. Thus the intermediate logical device 152 is not configured with hard disk drives included in the storage apparatus 1, but with the logical device 451, in which the intermediate logical device 152 is made to have correspondence with the logical device 451 in the external storage apparatus 4, so that the data in the intermediate logical device 152 is actually stored in the logical device 451 in the external storage apparatus 4. When the storage apparatus 1 executes input and output of the data for the intermediate logical device 152, an input/output request for the logical device 451 in the external storage apparatus 4 corresponding to the intermediate logical device 152 is issued to the external storage apparatus 4 from the storage apparatus 1, so that the external storage apparatus 4 executes an input/output process of the data for the corresponding logical device 451.

In the computer system 200 at the second site, for example, one storage apparatus 6 is coupled to a plurality of host computers 8 through a local network 7. To the local network 7 are coupled a plurality of external storage apparatuses 4. These storage apparatuses 4 are provided by carrying the external storage apparatus 4 in the first site and being connected to the local area network 7. The local network 7 is configured similar to the above-mentioned local network 2.

The storage apparatus 6 is coupled to the external storage apparatus 4 through the local network 7, thereby forming a copy target logical device 153 when executing an input/output process of data with the external storage apparatus 4.

Figure 2:
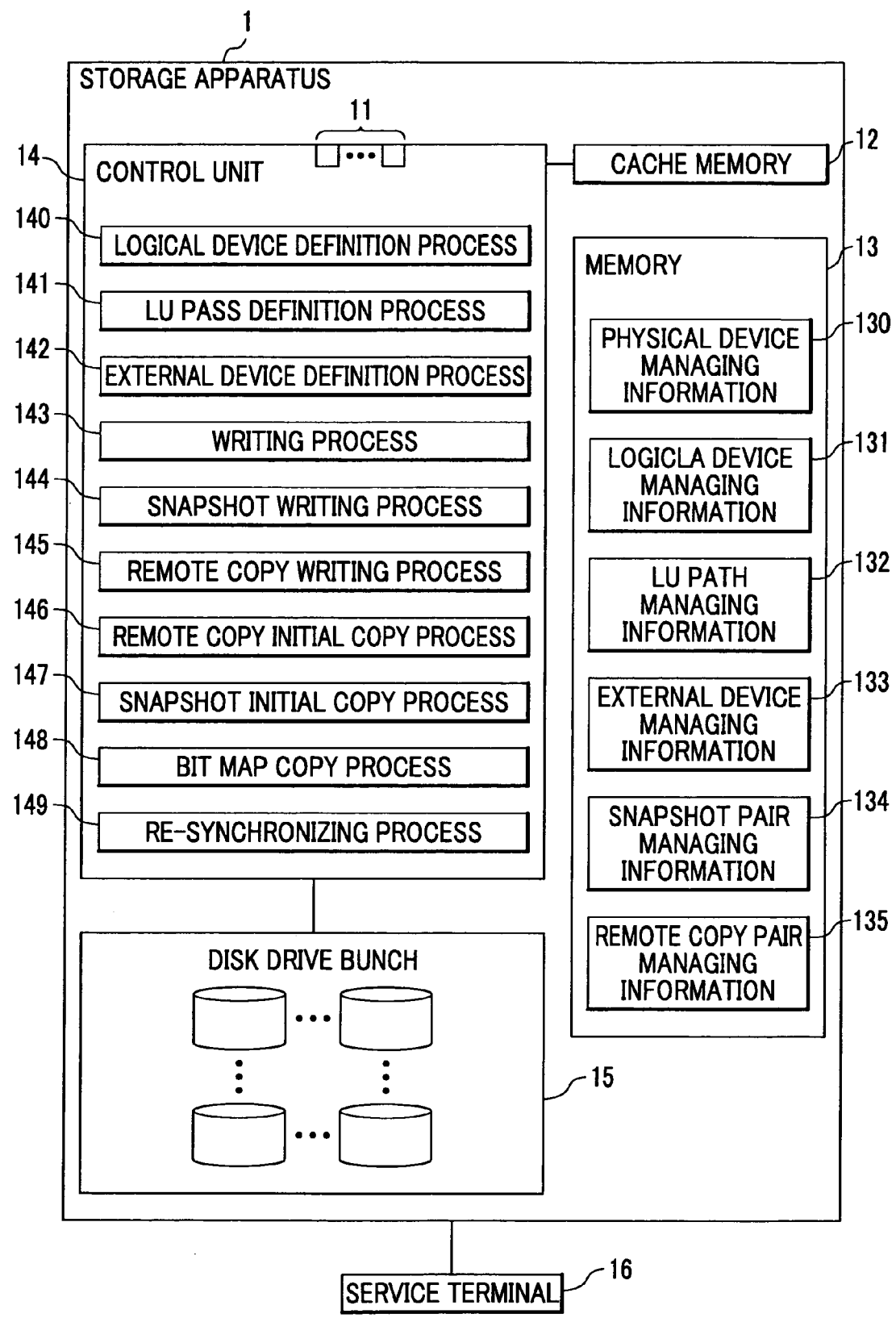
FIG. 2 is a block diagram illustrating a storage apparatus shown in FIG. 1.

FIG. 2 shows a structure of the storage apparatus. The storage apparatus 1 comprises ports 11, one or more cache memories 12, a memory 13, a control unit 14, and a disk drive bunch 15. In addition the storage apparatus 1 is connected to a service terminal 16 such as a note type personal computer. The service terminal 16 is used for maintenance service for the storage apparatus 1 and performs, for example, data display of the logical devices in the storage apparatus 1 on a display thereof. The external storage apparatus 4 and the storage apparatus 6 have the same structure as that shown in FIG. 2, and thus, the duplicated description will be omitted.

The ports 11 provide connection, for example, with the host computers 3. The cache memory 12 stores data of which reading and writing is requested by the host computers 3. The disk drive bunch 15 configured with a plurality of hard disk drives, in which the above-mentioned copy source logical device 151 is configured.

The control unit 14 comprises, for example, a controller or a processor to execute the following operations:

The control unit 14 performs a logical device definition process 140, an LU path definition process 141, an external device definition process 142, a writing process 143, and a snapshot writing process 144. Further, the control unit 14 performs a remote copy writing process 145, a remote copy initial copy process 146, a snapshot initial copy process 147, a bit map copy process 148, and a re-synchronizing process 149. These processes 140 to 149 are performed by execution of programs such as modules stored in the memory 13 with the control unit 14.

In the external device definition process 142 out of them, the storage apparatus 1 recognizes the logical device 451 (see FIG. 1) of the external storage device 4. The writing process 143 processes a writing request from the host computer 3 and a writing request for remote copy from the storage apparatus 1 at the first site.

The snapshot initial copy process 147 generates a snapshot of the copy source logical device 151 (see FIG. 1) in the intermediate logical device 152 (see FIG. 1). The snapshot is a copy of data in the copy source logical device 151 (see FIG. 1) at a specific timing in the intermediate logical device 152 (see FIG. 1).

The bit map copy process 148 copies a content of a first difference bit map d15 mentioned later in a second difference bit map d16. The re-synchronizing process 149 makes the content of the copy source logical device 151 (see FIG. 1) at the first site coincident with the content of the copy target logical device 153 (see FIG. 1) at the second site. The other processes are mentioned later.

The memory 13 stores physical device managing information 130, logical device managing information 131, LU path managing information 132, external device managing information 133, snapshot pair managing information 134, and remote copy managing information 135. Hereinafter, will be described the above-described information.

The physical device managing information 130 manages a storing region formed with one or more disk drives. More specifically, as shown in FIG. 3, the physical device managing information 130 includes a physical device number d1, a corresponding logical device number d2, a size d3, and a RAID structure d4. Further, the physical device managing information 130 includes a stripe size d5, a disk drive number list d6, an intra-disk-drive start offset d7, and an intra-disk size d8. The physical device number d1 is a number for identifying a physical device configured with one or more disk units.

The corresponding logical device number d2 is a number for identifying one of logical devices corresponding to the physical device within the storage apparatus 1. For example, when a logical device has not been assigned to the physical device, a value indicating invalidation is stored in the corresponding logical device number d2. The size d3 indicates a capacity of the physical device specified by the physical device number d1. The RAID structure d4 indicates information regarding the RAID structure such as a RAID level of the physical device, or the number of data disks or parity disks.

The stripe size d5 indicates a data splitting unit (stripe) length in the RAID structure. The disk drive number list d6 indicates the numbers of all disk drives forming each physical device. The number is a unique number for identifying the disk drives within the storage apparatus 1.

The intra-disk-drive start offset d7 indicates a top position of a data region of the corresponding physical device within a disk drive configuring each physical device. The intra-disk size d8 indicates a size indicative of a capacity of a storing region of each of disk drives configuring the physical device. These intra-disk-drive start offset d7 and intra-disk size d8 can indicate where the physical device occupies the data regions within each of the disk drive bunch 15. In this example, the offset and the size within the disk drive bunch 15 configuring the RAID structure are integrated. However, these may be changed.

Will be described the logical device managing information 131.

As shown in FIG. 4, the logical device managing information 131 includes a logical device number d10, a size d11, a copy function status d12, snapshot pair managing information d13, and remote copy pair managing information d14. Further, the logical device managing information 131 includes a first difference bit map d15, a second difference bit map d16, a coy progress pointer d17, and a bit map copy progress pointer d18. In addition, the logical device managing information 131 includes device kind information d19, a corresponding physical/external device d20, a port number/target ID/LUN d21, and a connected host computer name d22.

The logical device number d10 is a number for identifying the logical device. The size d11 indicates a capacity of the logical device identified by the logical device number d10.

The copy function status d12 indicates a used status of the copy function such as the snapshot and the remote copy. The used status includes "normal", "snapshot", "remote copy", and "in transit". The "normal" indicates a status where the copy function such as the snapshot and the remote copy is not performed for the logical device. "Snapshot" indicates a status where a snapshot function is used. "Remote copy" indicates a status where a remote copy function is used. "In transit" indicates a status where the function for the logical device is moving from "Snapshot" to "Remote copy".

The snapshot pair managing information d13 includes managing information when the snapshot function is adopted, namely, a snapshot pair number d40 mentioned later (see FIG. 7) and information indicating either of a copy source or a copy target.

The remote copy pair managing information d14 includes managing information when the snapshot function is adopted, namely, a remote copy pair number d50 mentioned later (see FIG. 8) and information indicating either of a copy source or a copy target of the snapshot.

The first difference bit map d15 is a bit map for storing stored region positions, namely, write positions, in the copy source logical device 151 in which data is written in response to a request from the host computer 3 while the status of the snapshot pair mentioned later is "separated". The first difference bit map d15 includes a plurality of bits, each bit corresponding to blocks derived by dividing an address space of the logical device at a regular amount (for example, a storing region for four bytes), wherein each bit stores either of "0" indicating that writing (write) has not been executed or "1" indicating writing has been executed. This provides confirmation of the positions where writing has performed in the copy source logical device 151.

The second difference bit map d16 has a similar structure as the first difference bit map d15 and stores writing positions in the logical device where writing has been performed while the remote copy function is adopted, and the status of the pair of the remote copy mentioned later is in "separated".

The copy progress pointer d17 indicates a top logical address position of a non-copied region of the logical device while the snapshot function or the remote copy function is adopted. The bit map copy progress pointer d18 is a pointer indicating a top position of region where the copy process has not finished when the content of the first difference bit map d15 (or the second difference bit map d16) is copied in the second difference bit map d16.

The device kind information d19 indicates a kind of the device configuring the logical device. For example, if the logical device is configured with the physical device in the same storage apparatus 1, the kind of the physical device is recorded therein. If the logical device is configured with the logical device 451 in the external storage apparatus, the kind of the external device is recorded therein. The external device mentioned herein means the logical device 451 of the external storage device 4 (see FIG. 1). For example, if neither of the physical device nor the external device is assigned, a value indicating invalidation is recorded in the device kind information d19.

The corresponding physical/external device d20 indicates either of the physical device number d1 (see FIG. 3) configuring the logical device or the external device number d30 (see FIG. 6) of the external device configuring the physical device number mentioned later. The physical device number d1 is applied to the physical device managing information 130 (see FIG. 3), and the external device number d30 is applied to the external device managing information 133 (see FIG. 6) mentioned later.

In the port number/target ID/LUN d21 is registered information used for accessing the logical device. The port number is a number for identifying the port 11 used for accessing the logical device and is a unique number for uniquely identifying the port 11 within the storage apparatus 1. The target ID and LUN (Logical Unit Number) are information used for identifying the logical device identified with the logical device d10 out of a plurality of the logical devices accessible through the port 11 identified with the port number. Further, the target ID is generally identifying information used in the logical device managing information 131 for identifying a forwarding target of data and used as information for identifying the logical device which becomes a target when the host computer 3 operates as an initiator. Further, in this embodiment, because it is assumed that input and output of the data is performed with an SCSI protocol between the host computer 3 and the storage apparatus 1, an SCSI ID and an LUN defined in the SCSI protocol are used.

The number of pairs of "port number/target ID/LUN" that can be defined in the storage apparatus 1 is limited, and thus it may be smaller than the number of the logical devices included in the storage apparatus 1. Then, the storage apparatus 1 has a function of changing the logical devices having correspondence with "port number/target ID/LUN". Hereinafter, it is referred to as "LU-path-defining the logical device to allow access to the logical device with the "port number/target ID/LUN". If the logical device has not been LU-path-defined, a null value is registered in the column of the port number/target ID/LUN d21 in the logical device managing information 131. On the other hand, if the logical device is LU-path-defined, a pair defined by "port number/target ID/LUN" is registered in the logical device managing information 131.

The connected host name d22 is a name of the host computer 3 that is permitted to access to the logical device. The host name is not particularly subject to restriction as long as it can uniquely identify the host computer 3 such as a WWN (World Wide Name) assigned to the port of the host 3.

Returning to FIG. 2, the LU path managing information 132 stores the information of the logical device currently LU-path-defined for each port 11 within the storage apparatus 1. More specifically, as shown in FIG. 5, the LU path managing information 132 includes port number/target ID/LUN d23, a corresponding logical device number d24, and a name of the host computer d25.

The port number/target ID/LUN d23 indicates the pair of "port number/target ID/LUN" assigned to each port 11. The corresponding logical device number d24 indicates the logical device number d10 (see FIG. 4) of the logical device path-defined for the set of "port number/target ID/LUN".

The connected host computer name d25 indicates the name of the host computer 3 that is allowed to access to LUN of the port 11.

The external device managing information 133 shown in FIG. 2 includes, as shown in FIG. 6, an external device number d30, a corresponding logical device d31, a size d32, storage identifying information d33, and an intra-external-storage device number d34.

The external device number d30 is identification information for the storage device 1 to identify the logical device possessed by the external storage apparatus 4 and for uniquely identifying the logical device within the external storage apparatus in the storage apparatus 1.

The corresponding logical device d31 indicates a device number of the logical device (intermediate logical device), within the storage apparatus 1, which is made to have correspondence with the logical device (hereinafter referred to as "external device") possessed by the external storage apparatus 4. For example, if the external device has not been assigned to a virtual logical device within the storage apparatus 1, a value indicating invalidation is stored therein. The size d32 indicates a storage capacity of the external device. For example, a value 100 GB is indicated here.

The storage identifying information d33 is that for identifying a vendor of the external storage apparatus 4 including the external device. As the storage identifying information d33, for example, there are combinations of vendor identification information for identifying a vendor (such as X company) of the external storage apparatus 4 and a production serial number assigned by the vender and the like.

The intra-external-storage device number d34 is information for identifying the logical device 451 configured within the external storage apparatus 4. More specifically, it is a number for uniquely identifying a logical device within the external storage apparatus 4 that is identified with the external device number d3 by the storage apparatus 1 or 6.

Figure 7:
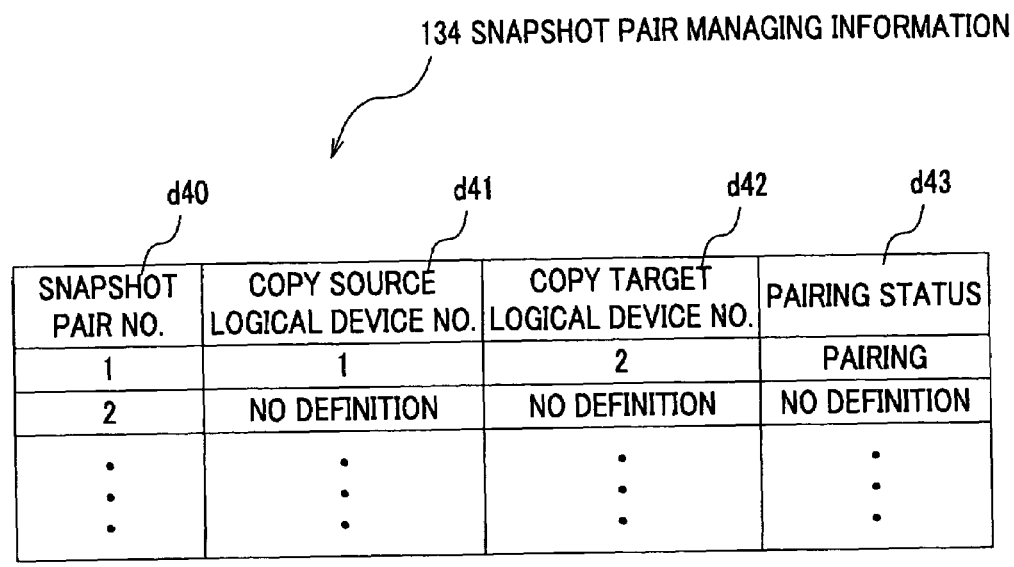
FIG. 7 illustrates snapshot pair managing information in the storage apparatus shown in FIG. 1.

As shown in FIG. 7, the snapshot pair managing information 134 includes a snapshot pair number d40, a copy source logical device number d41, a copy target logical device number d42, and a pairing status d43.

The snapshot pair number d40 is a number for identifying the pair of the copy source logical device and the copy target logical device of the snapshot. The copy source logical device number d41 is an identification number of the copy source logical device in the pair. The copy target logical device number d42 is an identification number of the copy target in the pair. The pairing status d43 indicates a status of the snapshot pair. The status includes "released", "copying", "pairing", and "separated". "Released" indicates the status that the pair of the snapshot is defined, but is released. In this status, the copy source logical device and the copy target logical device are in the same statuses as those in a normal condition.

"Copying" indicates a status where data is copied from the copy source logical device to the copy target device to accord the content of the copy source logical device with the copy target logical device. "Paring" indicates that the content in the copy source logical device accords that in the copy target logical device. In this status, if the content in the copy source logical device is changed, the change is reflected in the content in the copy target logical device.

"Separated" indicates the status where the copy source logical device is separated from the copy target device. In this status, when there is a writing request from the host computer 3, the copy source logical device is subject to writing, but the copy target device is subject to no writing. In this operation, a block position where writing is performed is managed in the first difference bit map d15 to make it possible to reflect the content of change caused by writing in the copy source logical device in the copy target logical device thereafter. Further, during "separated", writing access to the copy target logical device from the host computer 3 is not permitted, so that the body of the copy source logical device (such as the external storage device 4) can be removed from the first site.

Figure 8:
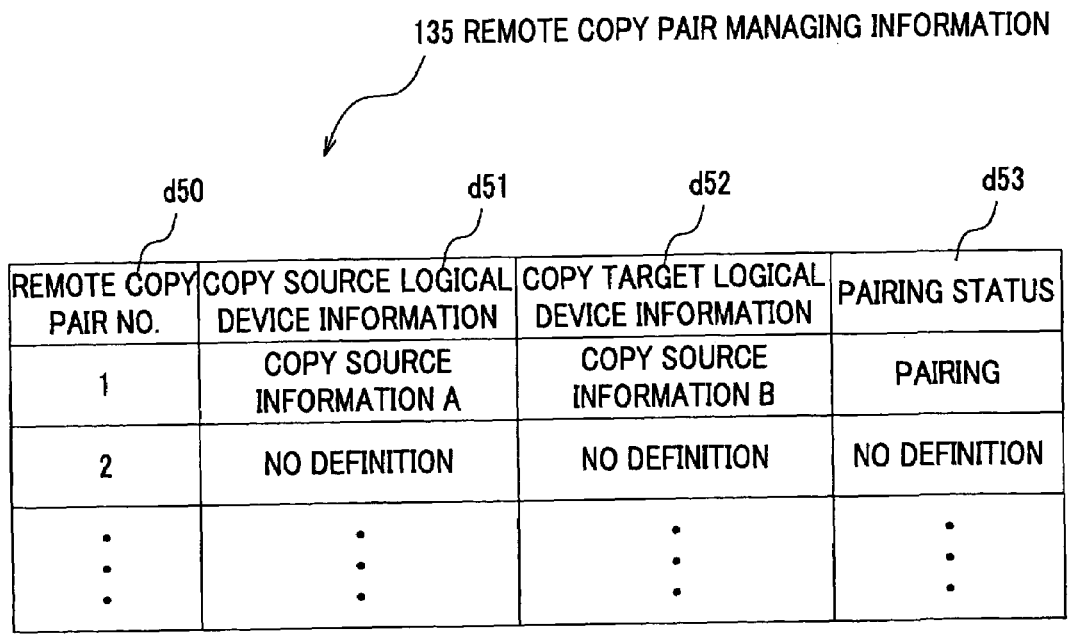
FIG. 8 illustrates remote copy pair managing information in the storage apparatus shown in FIG. 1.

As shown in FIG. 8, the remote copy pair managing information 135 includes a remote copy pair number d50, a copy source logical device information d51, a copy source logical device information d52, and a pairing status d53.

The remote copy pair number d50 is a number for identifying the remote copy pair to be a target.

The copy source logical device information d51 and the copy target logical device information d52 include information necessary for communication with the storing apparatus 1 which is to be the copy source or the copy target and information for identifying the copy source device 151 or the copy target logical device 153. More specifically, it includes information of a WWN of the port 11 of the copy source storage apparatus 1 or the storage apparatus 6 of the copy target, a target ID, and LUN. The pairing status d53 indicates a status of the remote copy pair, wherein the kind of this status is the same as that of the pairing status d43 shown in FIG. 7.

Will be described various processes in the storage apparatus 1 with reference to FIGS. 9 to 18.

First, will be described a sequential process for assigning the logical device 451 or the like within the external storage apparatus 4 to a particular host computer 3 to enable them to be used. This sequential process is provided using the external device definition process 142 (see FIG. 2), the logical device definition process 140 (see FIG. 2), and the LU path definition process 141 (see FIG. 2).

Figure 9:
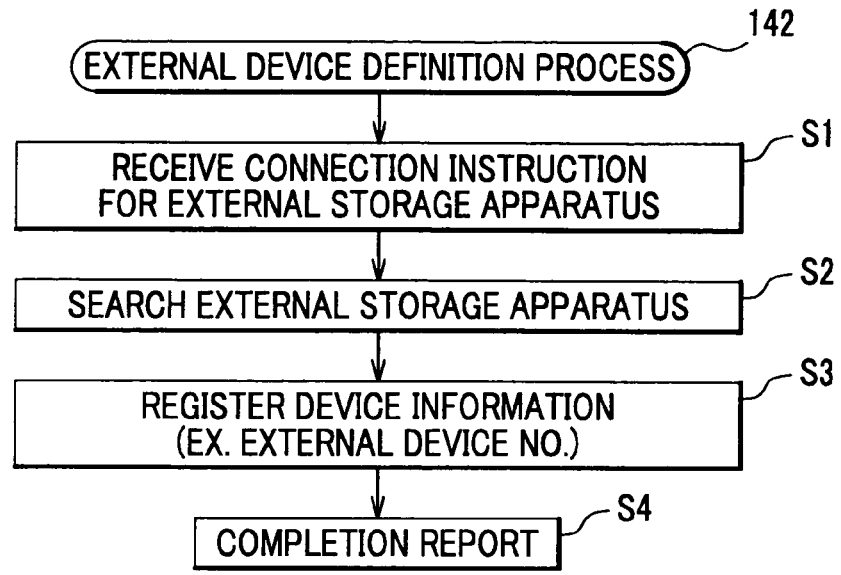
FIG. 9 depicts a flow chart illustrating an external device definition process shown in FIG. 2.

FIG. 9 depicts a flow chart of the external device definition process. Here, will be described a case where one of the storage apparatus 1 recognizes the logical devices in the external storage apparatus 4 in accordance with the external device definition.

First, a manager applies a connection instruction for the external storage apparatus 4 to the storage apparatus 1 by operating the service terminal 16 (see FIG. 2). The control unit 14 of the storage apparatus 1 receives the connection instruction for the external storage apparatus 4 (S1). The connection instruction from the service terminal 16 includes external storage apparatus identification information for identifying the external storage apparatus 4 to be connected. As the external storage apparatus identification information, for example, there is at least one of the WWN (World Wide Name) provided to the port 11 of the external storage apparatus 4 and storage identification information that is identification information of the external storage apparatus and further the port number of the port 11 of the storage apparatus 1 that is a connection target to the external storage apparatus 4.

In a step S2, in response to the connection instruction from the service terminal 16, the control unit 14 searches the external storage apparatus 4 to be connected. More specifically, when the control unit 14 only acquires the WWN provided to the port 11 of the external storage apparatus 4 as the external storage apparatus identification information, the control unit 14 transmits an Inquiry to the pair of all of "target ID/LUN" defined for the port 11 of the external storage apparatus 4 identified by the specified WWN. Then, the control unit 14 makes LUNs having normally responded become candidates of registration of the external device.

On the other hand, if the control unit 14 acquires the storage identification information of the external storage device as the external storage apparatus identification information, the control unit 14 confirms that the storage information included in the response accords with the storage identification information obtained in the step S1 with respect to all pairs of "target ID/LUN" defined in the ports having been detected by the control apparatus 14 (this detection process has been performed upon a port-log-in process) out of all ports of the external storage apparatus 4. After that, the target pairs of "target ID/LUN" are defined as candidates for registered external devices.

The response to the Inquiry command includes a size of the logical device LU-path-defined in the pair of "target ID/LUN" of the target port of the Inquiry command and storage identification information of the external storage apparatus 4 having the target port.

After that, the control unit 14 obtains the external device number d30 of the candidate for the registered external device and registers the external device number d30 in the external device managing information 133 (see FIG. 6).

Further, the control unit 14 registers, for each candidate for registered external device, sizes obtained in the responses to the Inquiry command in the size d32, the storage identification information in the storage identification information d33, in the external device managing information 133, and further registers the pairs of the port numbers and target ID/LUN of the target of the Inquiry command as the intra-external-storage device number d34 in the external device managing information 133. Since the corresponding logical device number d31 has not been assigned, an invalid value is set as the initial value. Next, the control unit 14 transmits a completion report to the service terminal 16 in a step S4. In response to this, the service terminal 16 having received the completion report displays the completion of the external device definition process 142, for example, on a computer display to report it to the manager.

This embodiment has been described in which the manager instructs connection and specifies the external storage unit 4 to be connected. The operation is not limited to this.

For example, the manager may instruct the storage apparatus 1 about the connection of the external storage apparatus 4, and the storage apparatus 1 may register all logical devices of all the storage apparatuses detected through all ports 11 of the storage apparatus 1 as external devices. Further, the manager may register all devices detectable by the storage apparatus 1 when the external storage device 4 is connected to the storage apparatus 1 without providing any special explicit connection instruction.

Figure 10:
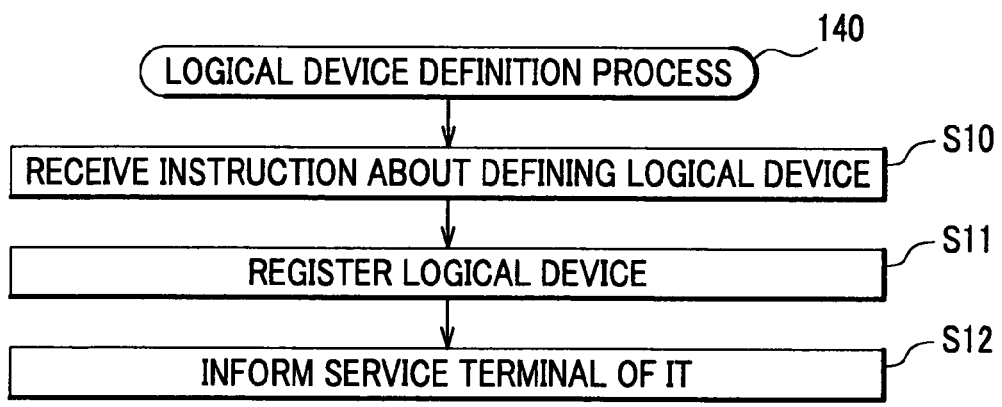
FIG. 10 depicts a flow chart illustrating a logical device definition process shown in FIG. 2.

FIG. 10 depicts a flow chart of a logical device definition process. The logical device definition process 140 is a process for defining the logical devices 151 or the intermediate logical devices 152 for the physical devices included in the storage apparatus 1 and the external devices included in the external storage apparatus 4. Further, the external devices are those defined by the above-mentioned external device definition process 142. Here, will be described the case where the intermediate logical device 152 is defined for the external device. However, the operation is the same as that in a case where the copy source logical device 151 is defined as to the physical device.

First, the manager operates the service terminal 16 (see FIG. 2) to transmit an instruction defining the intermediate logical device 152 to the storage apparatus 1, and the control unit 14 of the storage apparatus 1 receives the instruction (S10). The external device number of the external storage apparatus 4 to be defined and the logical device number of the intermediate logical device 152 to be defined is added to the instruction.

In this embodiment, will be described a case where one intermediate logical device 152 is assigned to one external device. However, one intermediate logical device 152 may be assigned, for example, to a device group including more than one external devices. Further, more than one intermediate logical device 152 may be defined for a device group including more than one external device. In this case, the logical device managing information 131 (see FIG. 4) should further include information of a start position and the size, of the logical device 451 within the external device.

In step S11, the control unit 14 registers the intermediate logical device 152 specified in the step S10 in the logical device managing information 131 (see FIG. 4). More specifically, is registered the specified logical device number of the intermediate logical device 152 at the logical device number d10, the specified size of the external device at the size d11, "external device" at the device kind information d19, and the specified external device number at the corresponding physical/external device d20. After completion of the registration, the control unit 14 reports the completion of the logical device definition process 140 to the request source.

Figure 11:
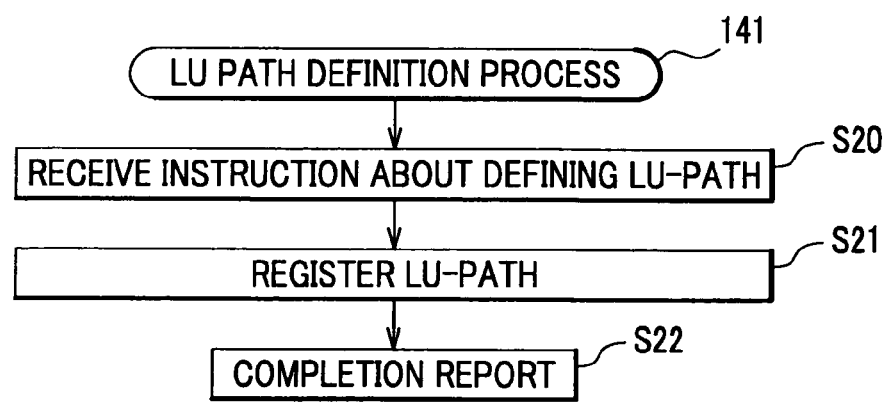
FIG. 11 depicts a flow chart illustrating an LU path definition process shown in FIG. 2.

FIG. 11 shows a flow chart illustrating the process of the LU-path definition process 141. First, the manager operates the service terminal 16 (see FIG. 2) to transmit an instruction for defining the LU path. Then, the control unit 14 of the storage apparatus 1 receives the instruction (S20). To the instruction is added identification information of the host computer 3 accessing the LU in addition to the logical device number of the target of definition and the pair of the port number of the port 11 defining the LU and "target ID/LUN".

In a step S21, the control unit 14 registers the LU path for the target logical device. More specifically, the control unit 14 sets the port number, the target Id, the LUN, and identification information of the host computer 3 specified by the service terminal 16 in the port number/target ID/LUN d21 and the connected host computer name d22, of the target device entry. Further, the control unit 14 sets values specified by the service terminal 16 at the port number/target ID/LUN d23, the corresponding logical device number d24, and the connectable host computer d25 in a vacant entry in the LU path managing information 132 (see FIG. 5). After completion of such connected host computer registration, the control unit 14 informs the service terminal 16 of the completion as a report (S22). After reception of the report, the service terminal 16 reports the completion of the LU path definition process 141 to the request source.

Next, will be described the writing process 143 with reference to FIGS. 12 to 14.

Figure 12:
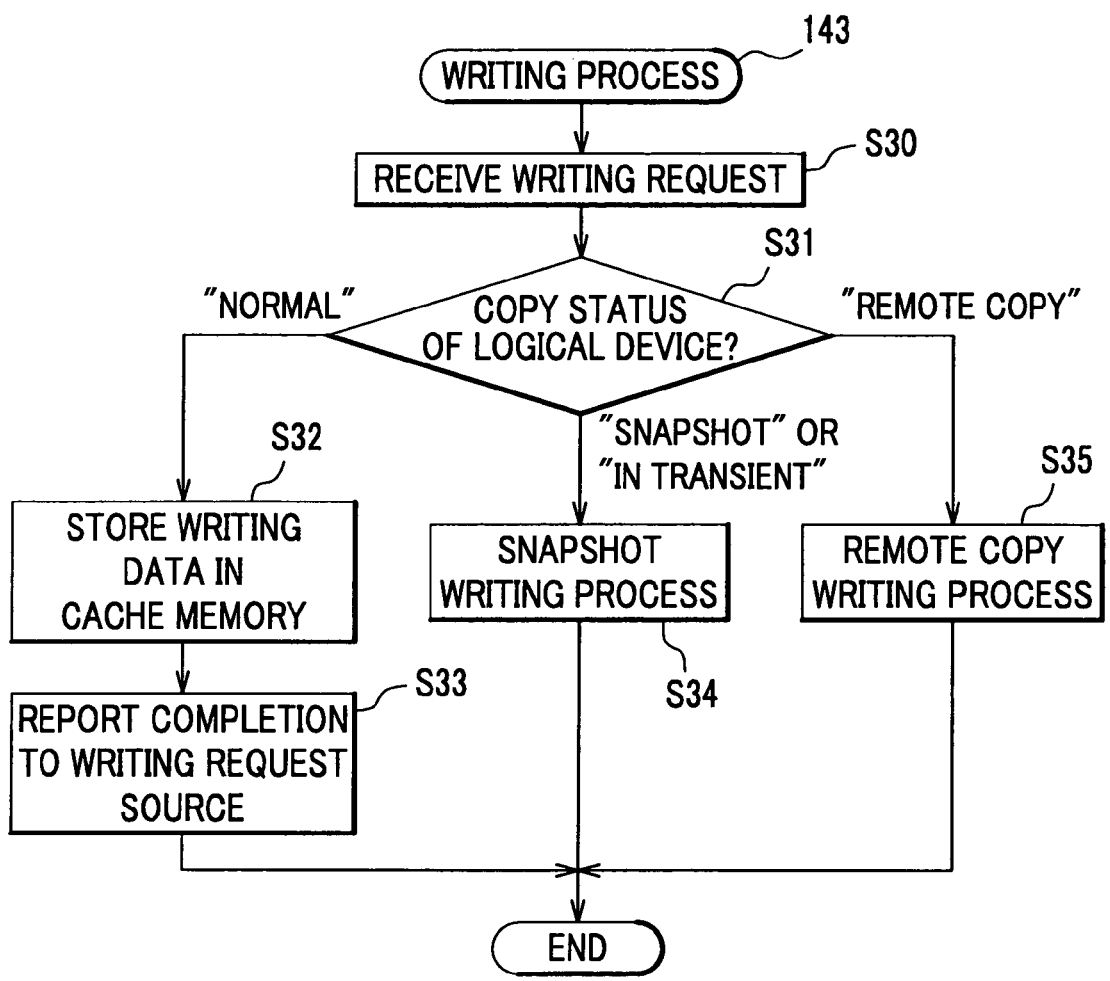
FIG. 12 depicts a flow chart illustrating the writing process shown in FIG. 2.

FIG. 12 shows a flow chart of the writing process. First, the control unit 14 receives a writing request (S30) from the host computer 3 or the storage apparatus 1 in the first site. After that, the control unit 14 determines the copy status of the logical device having become a target of writing in accordance with the writing request with reference to the copy function status d12 of the logical device managing information (S31). As a result of the determination, if the status is "normal" ("normal" in S31), the control unit 14 stores the writing data in the cache memory 12 (S32). Then, the control unit 14 transmits a report of the completion to the source of the writing request (the host computer 3 or the storage apparatus 1 in the first site) (S33).

If the determination in S31 is "snapshot" or "in transit", the control unit 14 performs the snapshot writing process 144 mentioned later (see FIG. 13) (S34). In this case, the source of the writing request is the host computer 3. Further, in the determination in the step S31, if the status is "remote copy", the control unit 14 performs the remote copy writing process 145 (see FIG. 14) mentioned later (S35). The source of writing request in this case is the host computer 3 or the storage apparatus 1 in the first site. The aforementioned statuses of "snapshot", "in transit", and "remote copy" will be describe later.

The snapshot writing process 144 will be described with reference to FIG. 13.

First, the control unit 14 judges the paring status d43 in the snapshot pair managing information 134 corresponding to the logical device that was made the target of writing in response to the writing request (S341). If the pairing status d43 is "released" ("released" in S341), the control unit 14 stores writing data in a cache memory 12 corresponding to the logical device that is a target of writing (S342) and transmits a completion report to the source of a writing request (S343). The logical device of a writing target in this case is the copy source of the copy destination of the snapshot.

On the other hand, when the pairing status is "pairing" ("pairing" in S341), the control unit 14 stores the writing data in the cache memory 12 corresponding to the logical device of the copy source of the snapshot and the logical device of the copy destination of the snapshot (S345). Then, the control unit 14 transmits the completion report to the source of the writing request. (S343).

If the paring status d43 is "copying" ("copying" in S341), because a region of the logical device of the writing target is limited to the logical devices of the copy source of the snapshot, the control unit 14 judges whether the region is one where copying has been done with reference to the copy progress pointer d17 (see FIG. 4) (S344). If the block position of the writing target exists prior to the block position indicated by the copy progress pointer d17, the control unit 14 determines that the region has been subject to copying ("Yes" in the step S344), processing proceeds the above-mentioned steps S345 and S343 in this order. In the step S345, the control unit 14 stores the writing data in the cache memory 12 corresponding to the logical device of the copy source of the snapshot and the logical device of the copy target of the snapshot (step S345) and then, transmits the completion report to the source of writing request.

In the step S344, if the block position of the writing target exists after the block position indicated by the copy progress pointer d17 (see FIG. 4), the control unit 14 determines that the region has been subject to no copying ("No" in the step S344), and processing proceeds to step S348 and S343 in this order. In the step S348, the control unit 14 stores the writing data in the cache memory 12 corresponding to the logical device of the copy source of the snapshot. In the step S343, the control unit 14 transmits the completion report to the source of writing request.

In the step S341, if the paring status d43 is "separated" ("separated" in a step S341), the control unit 14 proceeds to a step S346. In the step S346, with reference to the copy function status d12 of the logical device of the writing target (see FIG. 4), the logic unit 14 checks the copy function status. If the copy function status d12 is "snapshot", the control unit 14 changes a bit in the first difference bit map d15 (see FIG. 4) of the target logical device to "1" (S347).

On the other hand, if the copy function status d12 is "in transit" ("in transit" in the step S346), the control unit 14 proceeds to a step S349 where judging is made as to whether the bit on the first difference bit map d15 corresponding to the block position of the writing target has been subject to copying. If the bit corresponding to the block position of the writing target exists before the position indicated by the bit map copy progress pointer d18, the control unit 14 determines that the bit has been subject to copying ("Yes" in the step S349) and proceeds to a step S350. In a step S350, the control unit 14 changes the bit of the second difference bit map d16 (see FIG. 4) of the target logical device corresponding to the block position of the writing target to "1".

On the other hand, if the bit corresponding to the block position of the writing target exists after the position indicated by the bit map copy progress pointer d18, the control unit 14 determines that the target bit is subject to no copying ("No" in the step S349) and proceeds to the steps S347 and S348 in this order. In the step S347, the control unit 14 changes the bit on the first difference bit map d15 (see FIG. 4) of the target logical device corresponding to the block position of the writing target to "1". In the step S348, the control unit 14 stores the writing data in the cache memory 12 corresponding to the logical device of the copy source of the snapshot. Then, the control unit 14 transmits a completion report to the source of writing request (S343).

Will be described a flow of the remote copy writing process 145 with reference to FIG. 14. First, the control unit 14 judges which one of the host computers 3 and the storage apparatus 1 in the first site issued the received writing request on the basis of a transmission source address included in the writing request (S351). If the source of the writing request is the storage apparatus 1 in the first site (storage apparatus" in the step S351), the control unit 14 stores the writing data in the cache memory 12 of the logical device of the writing target due to the writing request and transmits the completion report to the storage apparatus 1 of the source of the writing request (S353).

On the other hand, if the source of the writing request is the host computer 3 ("host" in S351), the control unit 14 proceeds to a step S354, where judging the pairing status d53 (see FIG. 8) of the remote copy pair managing information 135 corresponding to the logical device of the writing request. If the pairing status d53 is "released", the control unit 14 stores the writing data in the cache memory 12 corresponding to the logical device of the writing target (S355) and then, transmits the completion report to the host computer 3 of the source of writing request (S362).

On the other hand, the pairing status d53 is "separated" ("separated" in the step S354), if the control unit 14 proceeds to a step S357 where the control unit 14 changes the bit on the second difference bit map d16 (see FIG. 4) corresponding to the block position of the writing target to "1". After that, the control unit 14 performs the process in the steps S355 and S362 like the case where the pairing status d53 is "released".

If the pairing status d53 is "pairing" ("pairing in the step S354), the control unit 14 stores the writing data in the cache memory 12 corresponding to the copy source logical device 151 of the remote copy (S359). Next, the control unit 14 performs writing in the logical device 153 of the copy source of the remote copy in the storage apparatus 6 in the second site (S360). Then, the control unit 14 transmits the completion report to the host computer 3 that is the source of the writing request (S362) after receiving the completion report of writing (S361).

If the pairing status d53 is "copying" ("copying" in S354), the control unit 14 proceeds to a step S358 and judges whether the block position of the writing target is included in the region where copying has been performed with reference to the copy progress pointer d17 (see FIG. 4) corresponding to the logical device of the writing target. If the block position of the writing target exists before the block position indicated by the bit map copy progress pointer d17, the control unit 14 determines that the region has been copied ("Yes" in S358) and performs processes from the steps S359 to S362. On the other hand, the block position of the writing target exists after the block position indicated by the copy progress pointer d17, the control unit 14 judges that the region has been subject to no copy ("No" in S358), hereinafter, the control unit 14 performs processes in the steps S355 and S362 like the case of the aforementioned "released" ("released" in S358).

Figure 13:
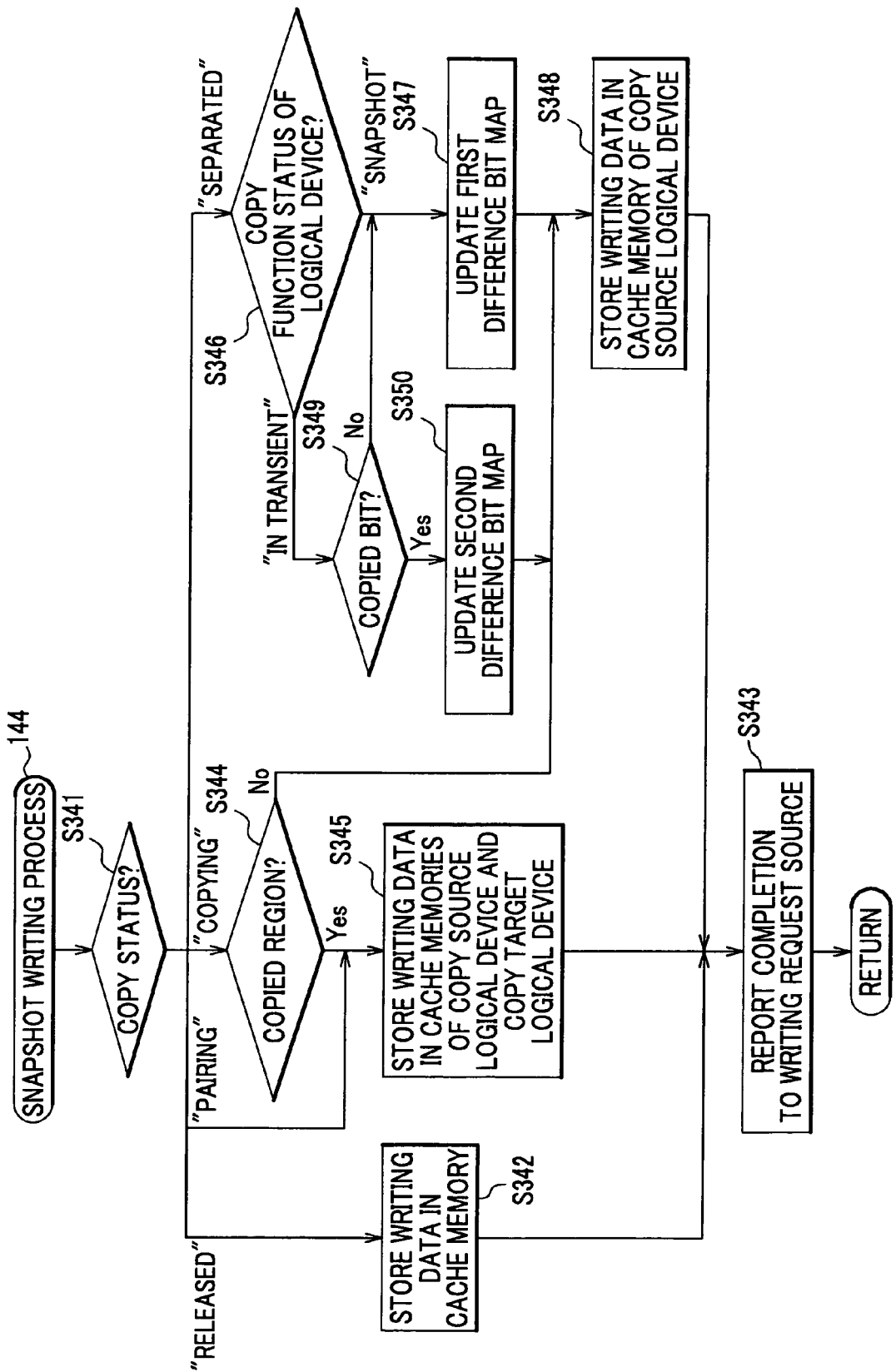
FIG. 13 depicts a flow chart illustrating the snapshot writing process shown in FIG. 2.
Figure 14:
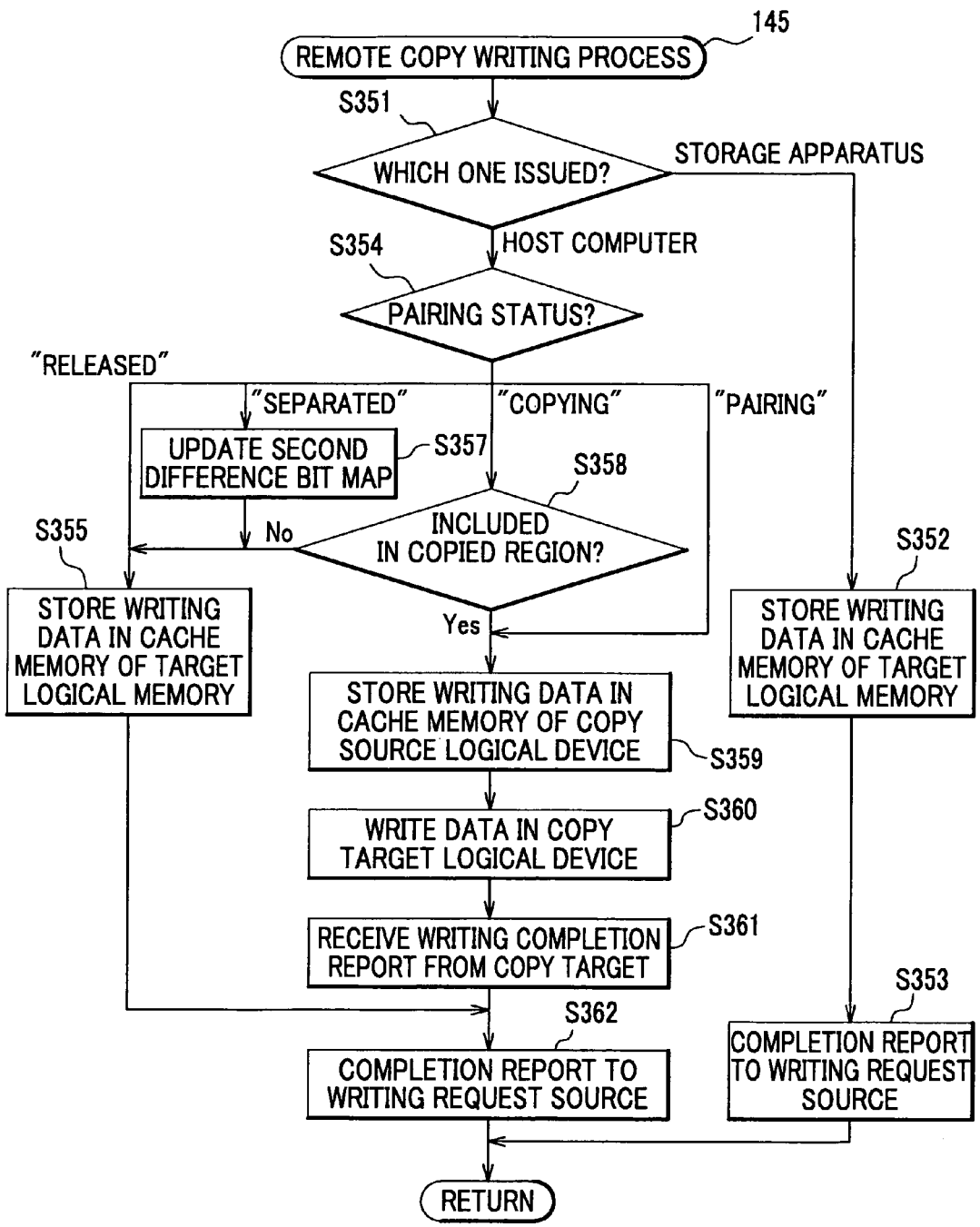
FIG. 14 depicts a flow chart illustrating the remote copy writing process shown in FIG. 2.
Figure 15:
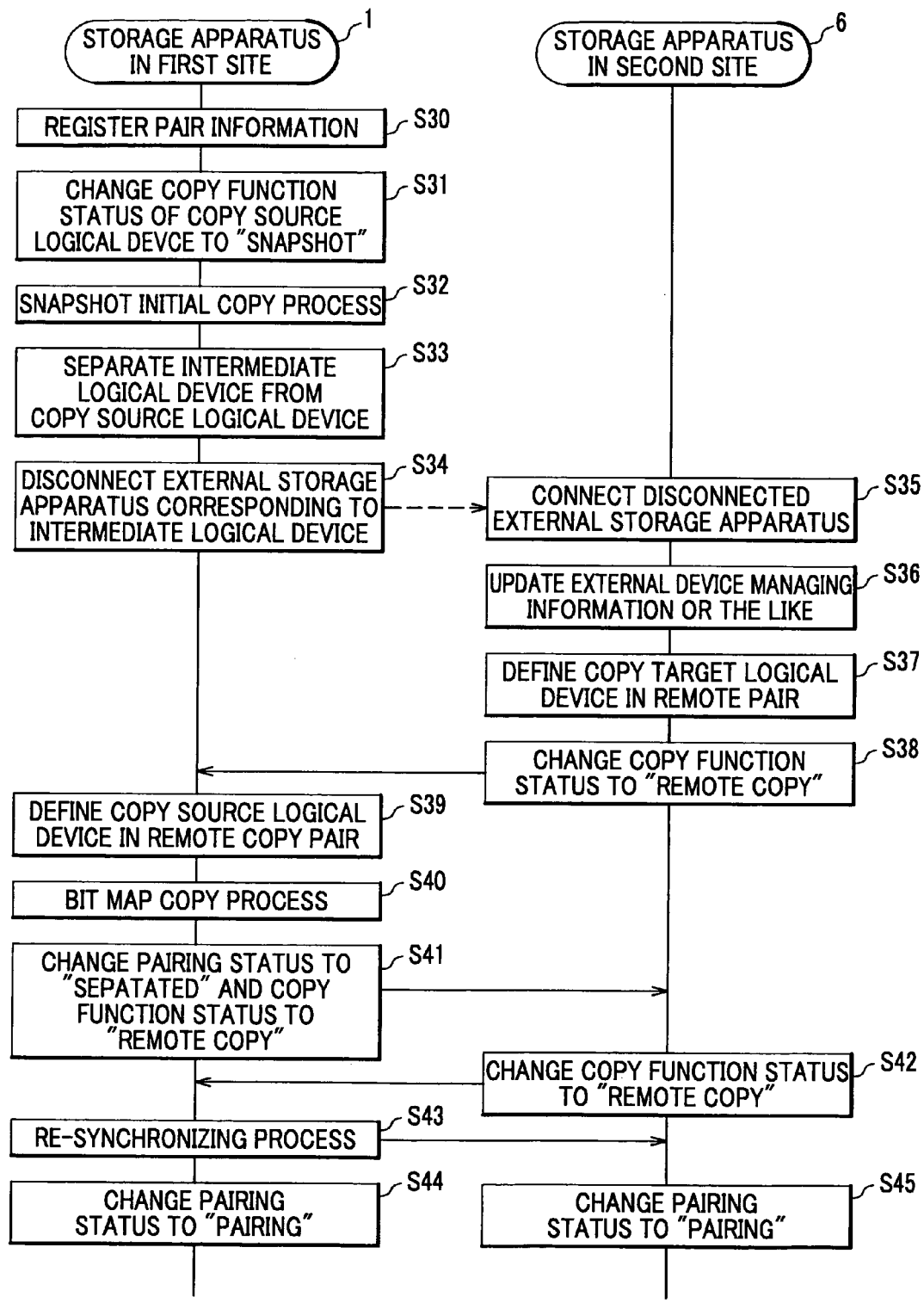
FIG. 15 depicts a general flow chart including the remote copy initial copy process shown in FIG. 2.

Further, the writing data stored in the cache memory 12 in the steps S32 in FIG. 12, S342, S345, and S348 in FIG. 13 and the steps S335, S359, and S352 in FIG. 15 or the like is stored in the logical devices corresponding to the cache memories 12 where the writing data is stored at given timing. The given timing may be after the transmission of the completion report in the step S343. For example, at timing when a processing load on the control unit 14 becomes lower than a predetermined threshold value, the writing data can be written in the logical device from the cache memory 12.

In this embodiment, it is assumed that the storage apparatus 1 has a cache memory 12 for each logical device, and thus, the writing data stored in the cache memory is written in the logical device corresponding to the cache memory 12. Thus, the writing data stored in the cache memory 12 corresponding to the logical device of the copy source is stored in the logical device of the copy source and that stored in the cache memory 12 corresponding to the logical device of the copy target is stored in the logical device of the copy target. However, if the storage device 1 does not have a plurality of cache memories 12, the same process shown in FIG. 13 can be provided by controlling storing regions of the cache memory 12 to store the writing data in each storing region corresponding to each logical device.

Further, if the writing data is written in the cache memory 12 corresponding to the intermediate logical device 152, a writing request for the writing data from the cache memory in this intermediate logical device is issued at given timing from the storage apparatus 1, where the intermediate logical device is defined, to the external storage apparatus 4 having the external device with correspondence to the intermediate logical device. In response to the writing request, the writing data is transmitted to the external storage apparatus 4 to write the writing data in the target external device.

The remote copy initial copy process 146 will be described with reference to FIGS. 15 to 18. Here, a process of the initial copy is described for the case where the remote copy is performed between the copy source logical device 151 and a copy target logical device 451 included in the storage apparatus 6 in the second site.

FIG. 15 shows a general flow chart of the initial copy process of the initial copy for the remote copy. The description is made with assumption that the initial copy for the remote copy is performed without routing the writing data through the global network.

More specifically, first the data to be copied is once copied in the intermediate logical device 152 in the storage apparatus 1. The copying is done with the above-mentioned snapshot function. Subsequently, the intermediate logical device 152 is isolated from the above-mentioned the copy source logical device 151, and then, the external storage apparatus 4 having the logical device 451 corresponding to the intermediate logical device 152 is moved with transportation such as an automobile from the first site of the copy source to the second site. In other words, the movement does not use the global network 5 at this phase.

During the transport of the external storage apparatus 4, the data in the copy source logical device 151 is kept in an updatable status in response to the write request from the host computer 3. If the data within the copy source logical device 151 is updated, an updated position in the copy source logical device 151 is controlled on the first difference bit map d15. This structure enables the host computer 3 to access the copy source logical device 151 during the transport of the external storage apparatus 4.

Next, the external storage apparatus 4 is installed in the second site, and the storage apparatus 6 in the second site is made to recognize the logical device 451 as an external device. For this, the control unit 14 of the storage apparatus 6 in the second site performs the external device definition process 142 shown in FIG. 9. Further, the control unit 14 of the storage apparatus 6 in the second site performs the logical device definition process 140 shown in FIG. 10 to provide correspondence of the copy target logical device in the target storage device 6 with the external device recognized by the external device definition process 142 and performs the LU path definition process 141 to LU-path-define a target intermediate logical volume for the port 11 of the storage apparatus 6.

Further, the remote copy pair is provided between the copy source logical device 151 in the first site and the copy target logical device to perform the re-synchronizing process to accord the contents of both logical devices. This will be described in detail.

First, in the step S30 in FIG. 15, the control unit 14 of the storage apparatus 1 installed in the first site 100 registers pairing information in the snapshot pair managing information 134 (see FIG. 7). The pairing information includes the snapshot pair number d40, the copy source logical device number d41, and the copy target logical device number d42.

In the step S31, the control unit 14 changes the copy function status of the logical device that is the copy source of the remote copy. More specifically, the control unit 14 changes the copy function status d12 of the logical device managing information 131 (see FIG. 4) corresponding to the target logical device into "snapshot". This is because once the snapshot is made in the inside of the storage apparatus 1 in the first site 100 to perform the initial copy of the remote copy at a high speed.

Next, the control unit 14 performs the initial copy of the snapshot function (S32). More specifically, the control unit 14 copies all data from the copy source logical device 151 of the copy source of the snapshot to the intermediate logical device 152 by the snapshot initial copy process 147. The snapshot initial copy process 147 will be described in detail with reference to FIG. 16 mentioned later.

After completion of the initial copy in the step S32, the control unit 14 separates the copy source logical device 151 from the intermediate logical device 152 (S33). More specifically, the control unit 14 fixes copy target data in the intermediate logical device 152 as static image and then, performs "separation" operation to inhibit updating of the copy target data thereafter.

More specifically, the control unit 14 executes the following process in the step S33.

First, the control unit 14 identifies the snapshot pair number d40 (see FIG. 7) from the snapshot pair managing information of the logical device managing information 131 for the logical device of the copy source of the snapshot. Next, the control unit 14 changes the pairing status d43 (see FIG. 7) in the snapshot pair managing information d13 (see FIG. 4) to "separated". This can make the status capable of continuously receiving the write request from the host computer 3.

In the step S34, for example, the manager disconnects from the local network 2 the external storage apparatus 4 that is a physical storing target for the intermediate logical device 152. Thus, the external storage apparatus 4 is disconnected from the storage apparatus 1. Next, the external storage apparatus 4 is transported to the second site with a transport such as a truck and then is connected to the local network 7 in the second site. The transport is provided with other movable bodies such as a train and an aircraft.

In the step S35, the control unit 14 of the storage apparatus 6 installed in the second site 200 is connected to the external storage apparatus 4 disconnected in the step S34 and connected to the local network 7. This brings the storage apparatus 6 in a state communicable with the external storage apparatus 4.

Next, the control unit 14 of the storage apparatus 6 updates, for example, the external device managing information 133 (see FIG. 6) to provide the logical device 451 in the external storage apparatus 4 connected as a logical device of the storage apparatus 6 itself in the step S36. In this case, the manager instructs the storage apparatus 6 in the second site about a connection of the external storage apparatus 4 with the service terminal 16. In response to the connection instruction, the control unit 14 of the storage apparatus 6 performs the processes from the steps S1 to S4 shown in FIG. 9 to obtain the number in the external device number d30 of the external storage apparatus 4 to register the number in the external device managing information 133 (see FIG. 6). Further, the manager instructs the storage apparatus 6 in the second site 200 about defining the copy target logical device 153 with the service terminal 16.

In response to the instruction, the control unit 14 of the storage apparatus 6 performs the processes from the steps S10 to S12 in the logical device definition process shown in FIG. 10 to register the logical device number in the copy target logical device 153 specified as the logical device number d10 in FIG. 4, a size of the external device specified in the size d11, "external device" in the device kind information d19, the external device number specified in the corresponding physical/external device d20, in the logical device managing information 131 (see FIG. 4). In addition the manager instructs the storage apparatus 6 in the second site 200 about defining the LU path with the service terminal 16. In response to this instruction, the control unit 14 of the storage apparatus 6 sets values specified from the service terminal 16 in the port number/target ID/LUN d23, the corresponding logical device number d24, and the connected computer name d22 in the LU managing information 132 (see FIG. 5).

In a step S37, the control unit 14 of the storage apparatus 6 defines the copy target logical device 153 of the storage apparatus 6 made to have correspondence to the external device in the step S36. More specifically, at the remote copy pair number d50, the copy source logical device information d51, and information of the copy target logical device information d52, the control unit 14 of the storage apparatus 6 sets the remote copy pair number, information of the copy source logical device 151 such as the WWN, the target ID, and the LUM of the port 11 of the storage apparatus 1 and information of the copy target logical device 153 of the copy target such as the WWN, the target ID, the LUN of the port 11 of the storage apparatus 6. This operation provides a preparing process for defining the copy target logical device 153 and the copy source logical device 151 as the remote copy pair.

In a step S38, the control unit 14 of the storage apparatus 6 updates the logical device managing information 131 (see FIG. 4) to make the remote copy possible for the copy target logical device 153 that becomes a remote copy target. More specifically, the control unit 14 sets the copy function status d12 of the logical device that is the target of the remote copy to "remote copy". After that, the control unit 14 of the storage apparatus 6 informs the storage apparatus 1 in the first site 100 of it.

Next, the control unit 14 of the storage apparatus 1 defines the copy source logical device 151 of the remote copy pair (S39). The process of this definition is the same as that in the step S37, and thus, the duplicated description will be omitted. After that, the control unit 14 performs the bit map copy process 148 mentioned later for the copy source logical device 151 in the storage apparatus 1. More specifically, the control unit 14 changes the copy function status dl of the copy source logical device 151 to be a remote copy target to "in transit" to perform the bit map copy process 148.

In a step S40, copying the first difference bit map into the second difference bit map records the writing position of the writing process for the copy source logical device 151 after the step S33 on the second difference bit map. Further, the re-synchronizing process 149 is executed with the second difference bit map with a result that updating the data of the copy source logical device by the writing process for the copy source logical device 151 after the step S33 is reflected in the copy target logical device 153 of the storage apparatus 6 in the second site.

After completion of the bit map copy process 148, the control unit 14 of the storage apparatus 1 changes, in a step S41, the pairing status d53 (see FIG. 8) of the copy source logical device to "separated" and the copy function status d12 (see FIG. 4) to "remote copy".

The control unit 14 of the storage apparatus 6 installed in the second site 200 changes, in a step S42, the pairing status d53 (see FIG. 8) corresponding to the copy source logical device 151 to "separated". After that, the control unit 14 informs the storage apparatus 1 in the first site 100 of it.

The control unit 14 of the storage apparatus 1 performs, in a step S43, the re-synchronizing process 149 mentioned later. This accords the data between the copy source logical device 151 in the first site and the copy target logical device 153 in the second site, and the control unit 14 changes the pairing status d53 corresponding to the logical device 151 of the copy source and the logical device 153 of the copy target (see FIG. 8) to "pairing" (S43). This operation completes the initial copy process of the remote copy.

Figure 16:
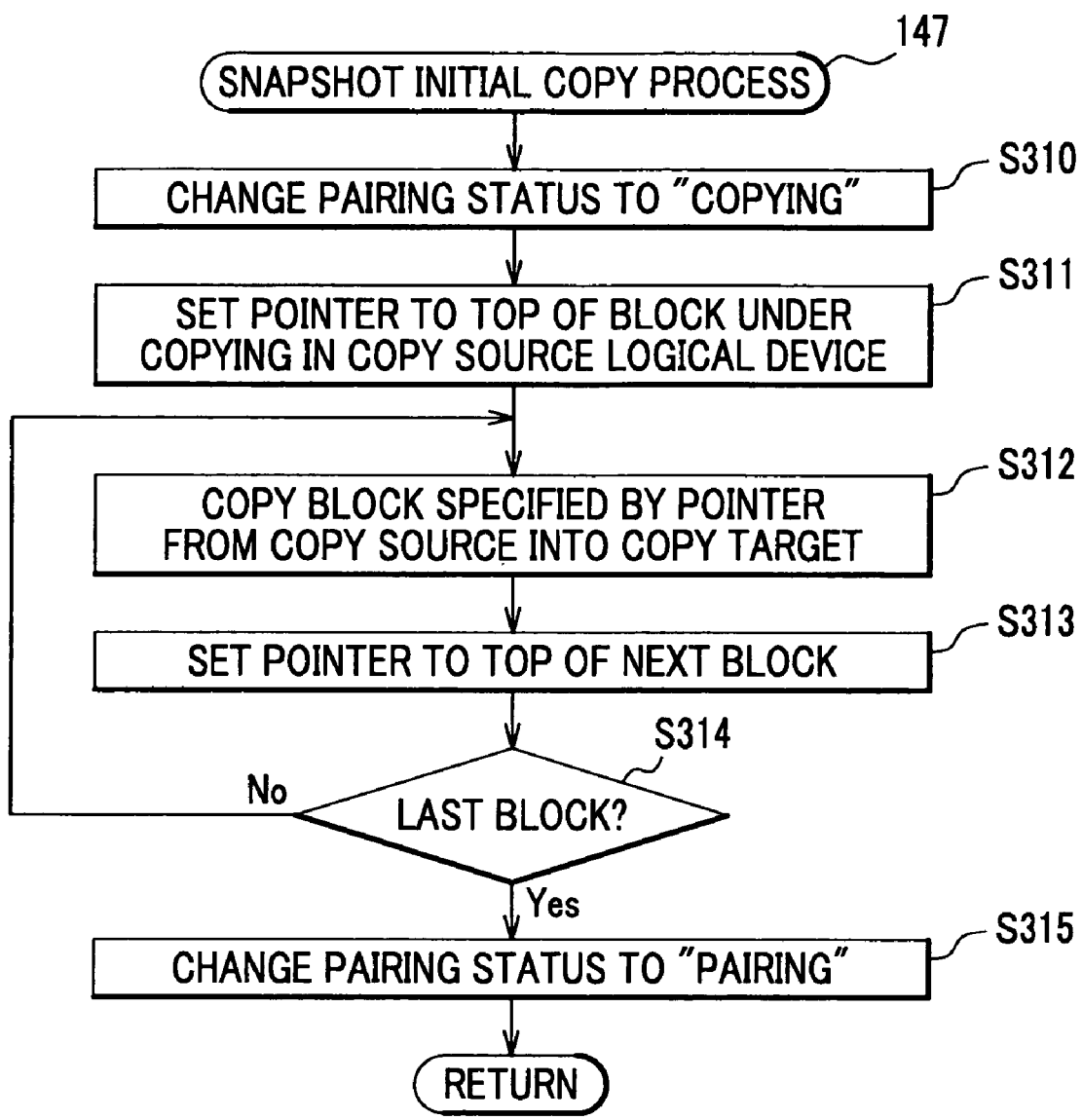
FIG. 16 depicts a flow chart illustrating the snapshot initial copy process shown in FIG. 2.

Here, a flow of the snapshot initial copy process 147 in the step S31 shown in FIG. 15 will be described with reference to FIG. 16.

First, in a step S310, the control unit 14 of the storage apparatus 1 changes the pairing status d40 of the snapshot pair managing information 134 indicative of the pairing status between the copy source logical device and the copy target logical device to be processed for the snapshot to "copying".

In a step S311, the control unit 14 of the storage apparatus 1 sets a pointer, namely, the copy progress pointer d17 (see FIG. 4), to the top of the block of the copy source logical device 151 under copying. Subsequently, the control unit 14 copies the block specified by the copy progress pointer d17 to the copy target (S312).

Next, the control unit 14 sets the copy progress pointer d17 to the top of the next block (S313). Then, the control unit 14 judges whether the copy progress pointer d17 reaches the end of the copy target logical device, namely, the end block, (S314). If the copy progress pointer d17 reaches the end block ("Yes" in the step S314), processing returns to the process in FIG. 15. If the copy progress pointer d17 does not reach the end block ("No" in the step S314), processing returns to the step S312.

In a step S315, the control unit 14 changes the pairing status d43 in the snapshot pair managing information 134 (see FIG. 7) to "paring".

Figure 17:
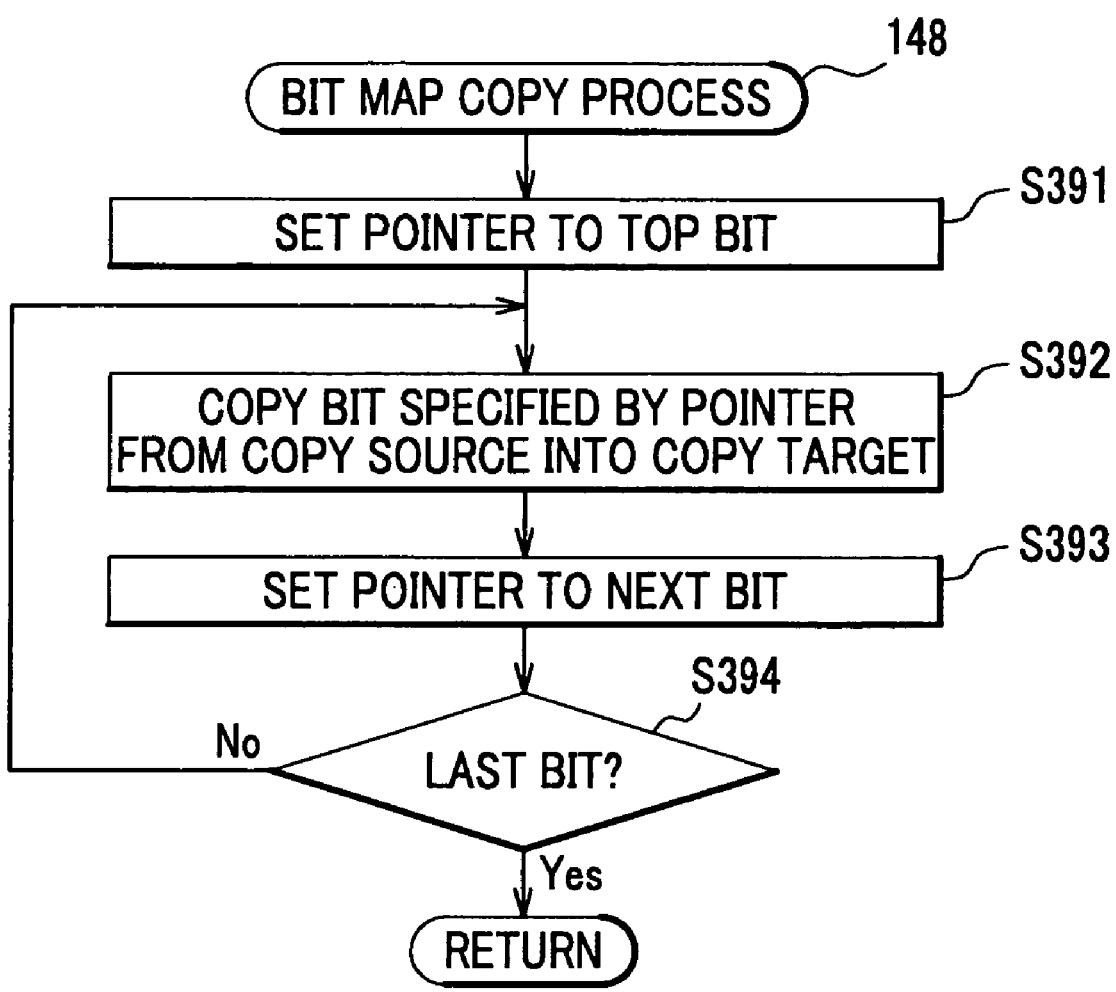
FIG. 17 depicts a flow chart illustrating the bit map copy process shown in FIG. 2.

A flow of the bit map copy process 148 in the step S39 shown in FIG. 15 will be described with reference to FIG. 17. First, in step S391, the control unit 14 of the storage apparatus 1 sets a pointer, namely, a bit map copy progress pointer d18 (see FIG. 4) for the bit of the copy source logical device 151. After that, the control unit 14 copies the bit specified by the bit map copy progress pointer d18 from the first difference bit map d15 to the second difference bit map d16 (S392).

Next, the control unit 14 sets the bit map copy progress pointer d18 to the next bit (S393). After that, the control unit 14 judges whether the bit map copy progress pointer d18 reaches the end of the logical device that is a target of copy, namely, the end bit (S394). If the bit is the last one ("Yes" in the step S394), processing returns to the process in FIG. 15, and if the bit is not the last one ("No" in the step S394), processing returns to the step S392.

Figure 18:
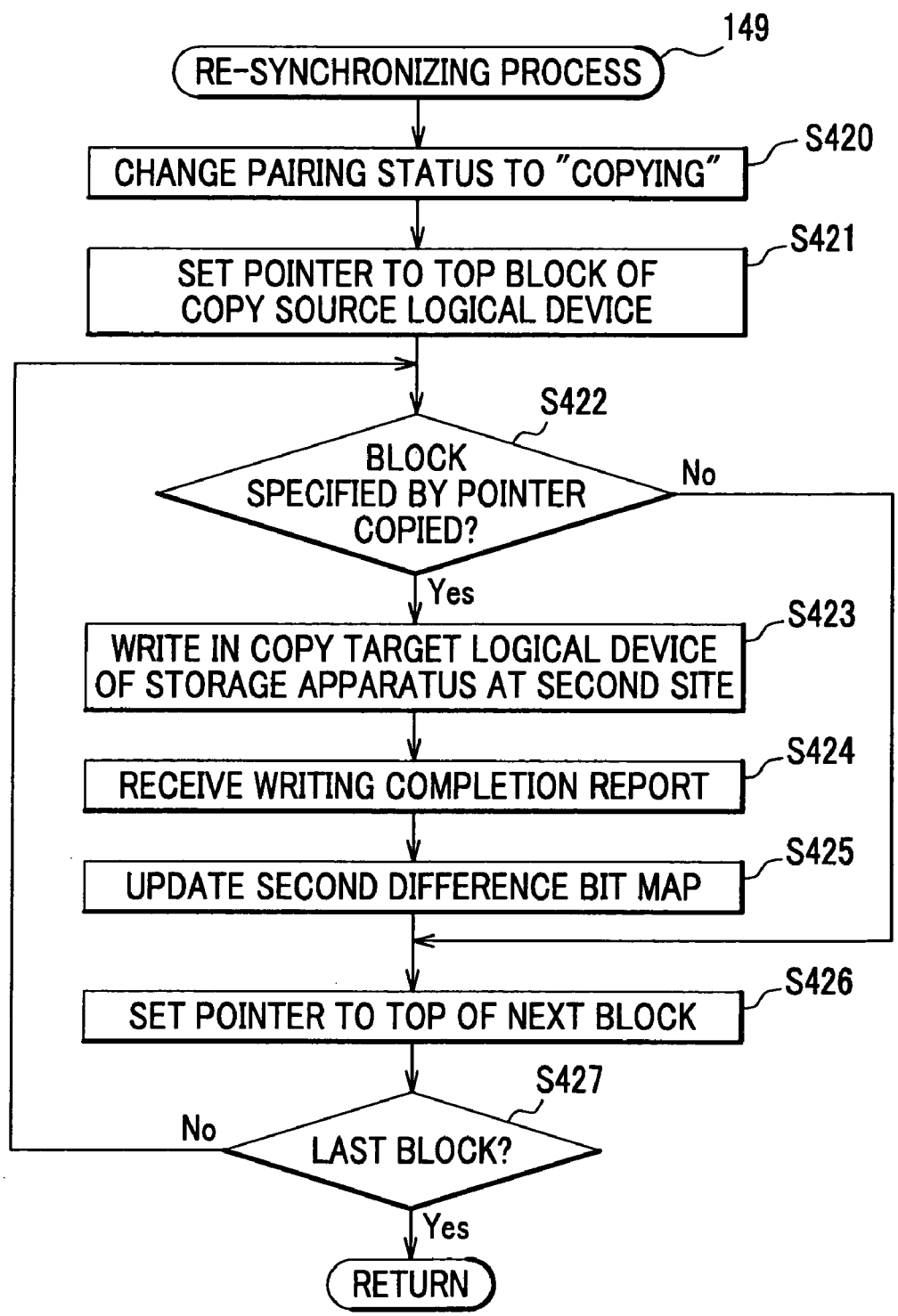
FIG. 18 depicts a flow chart illustrating the re-synchronizing process shown in FIG. 2.

The re-synchronizing process 149 in the step S42 shown in FIG. 15 will be described with reference to FIG. 18. First, in a step S420, the control unit 14 of the storage apparatus 1 changes the pairing status d53 of the remote copy pair managing information 135 indicative of the pairing status regarding the copy source logical device and the copy target logical device to "copying".

In a step S421, the control unit 14 of the storage apparatus 1 sets the copy progress pointer d17 (see FIG. 4) to the top block of the copy source logical device 151. Subsequently, the control unit 14 judges whether the block indicated by the copy progress pointer d17 is copied with reference to the second difference bit map d16 (see FIG. 4) corresponding to the copy source logical device 151 (S422). For example, if any bit in the second difference bit map d16 of the target block is "1", copying is necessary. On the other hand, if it is "0", copying is unnecessary.

As a result of the judgment, if the copy is unnecessary ("No" in the step S422), the control unit 14 proceeds to a step S426 where setting the copy progress pointer d17 to the top of the next block.

On the other hand, if the copying is necessary ("Yes" in the step S422), the control unit 14 writes the block specified by the copy progress pointer d17 in the copy target logical device 153 of the storage apparatus 6 installed in the second site 200 through the global network 5 (S423). Thus, the storage apparatus 6 installed in the second site 200 writes the block in the copy target logical device 153.

After receiving a writing completion report from the storage apparatus 6 in the second site (S424), the control unit 14 of the storage apparatus 1 changes the bit in the second difference bit map d1 corresponding to the written block to "0" (S425).

In the step S426, the control unit 14 sets the copy progress pointer d17 to the top of the next block to advance the copy progress pointer d17 by one block. In a step S427, the control unit 14 judges whether the copy progress pointer d17 reaches the end of the logical device of the copy target, namely, the last block. If the copy progress pointer d17 reaches the last block ("Yes" in the step S427), processing returns to the process in FIG. 15. If the copy progress pointer d17 does not reach the last block ("No" in the step S427), processing returns to the step S422.

As mentioned above, according to the first embodiment, first the storage apparatus 1 in the first site 100 generates a snapshot between the copy source logical device 151 and the intermediate logical device 152 and change the pairing status of the snapshot to disconnection. Subsequently, the external storage apparatus 4 in which the logical device 451 corresponding to the intermediate logical device 152 is moved to the second site with a transporting means (such as a train), and is connected to the local network 7 in the second site and further, is registered as a copy target logical device 153 in the storage apparatus 6 in the second site 200. After that, the data in the copy source logical device 151 is accorded with the data in the copy target logical device 153 between the storage apparatus 1 in the first site and the storage apparatus 6 in the second site. Thus, after the logical device 451 of the external storage apparatus 4 is recognized in the storage apparatus 6 in the second site 200 without routing the global network 5, the initial copy for the remote copy is provided. Thus, the addition of the external storage apparatus 4 to the second site 200 provides increase in the storage capacity of the whole of the second site. This is preferable as a data center functioning as a remote site (second site) for a plurality of local sites (first sites). In addition, the initial copy is performed with the second difference bit map d16, so that copying only the difference in the data via the global network 5 provides the initial copy for the remote copy.

Second Embodiment

A second embodiment will be described with reference to FIGS. 19 to 20. The same elements as those in the first embodiment will be designated with the same references, and thus, the duplicated description will be omitted.

Figure 19:
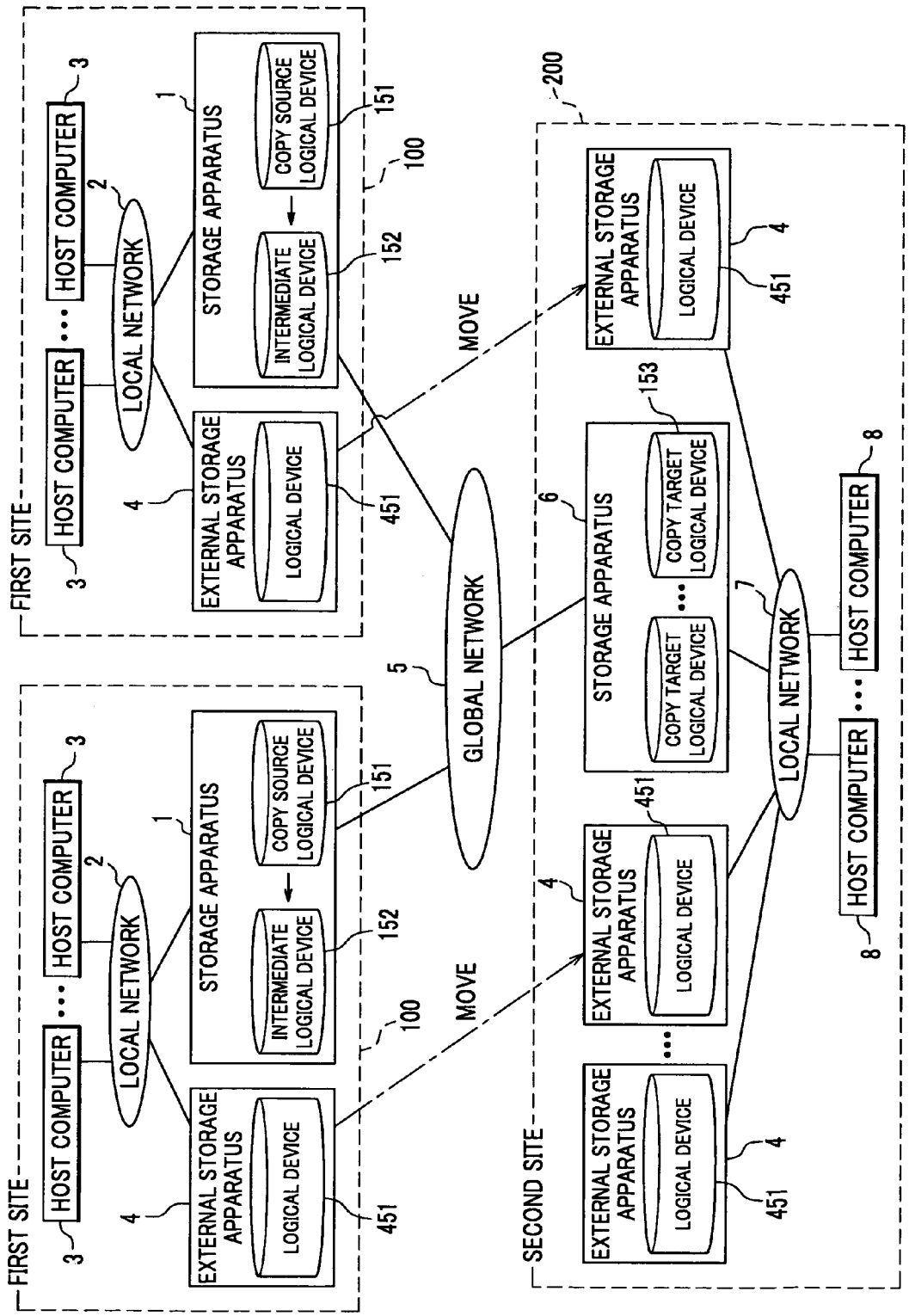
FIG. 19 is a block diagram illustrating an example of structure of a remote copy system according to a second embodiment.

FIG. 19 illustrates a configuration of the initial copy system for the remote copy according to the second embodiment. This embodiment features that the intermediate logical device 152 is a copy source of the snapshot and the copy source logical device 151 is a copy target of the snapshot. In other word, a direction of the copy operation is inversed against the first embodiment, and other structure is substantially the same as that of the first embodiment.

FIG. 20 illustrates a flow of an initial copy process 146 for the remote copy. In FIG. 20, steps S32A and S33A replace the steps S32 and S33 in FIG. 15, which is difference from FIG. 15. Thus, the difference is mainly described.

In the step S32A, the control unit 14 performs the snapshot initial copy process 147 in which a direction of copying is inverted in comparison with the first embodiment. More specifically, all data is copied from the intermediate logical device 152 to the copy source logical device 151.

The step S33A will be described. In the initial status in the step S33A, a physical device is made to have correspondence with the copy source logical device 151 and the external device is made to have correspondence with the intermediate logical device 152.

In the step S33A, the copy source logical device is separated from the intermediate logical device 152 and the copy source logical device 151 is swapped with the intermediate logical device 152. More specifically, the pairing status d43 in the snapshot pair managing information 134 corresponding to the copy source logical device 151, namely, the snapshot pair managing information 134 corresponding to the intermediate logical device 152, are changed to "separated", respectively.

Next, the values of the device kind information d19 in the logical device managing information 131 corresponding to the copy source logical device 151 is swapped with the value of the intermediate logical device 152. Similarly, the value of the corresponding physical/external device d20 is swapped therebetween. In this condition, the copy source logical device 151 and the intermediate logical device 152 are made to have correspondence with the external device and the physical device, respectively. Thus, the copy source logical device 151 is read as the intermediated logical device and the intermediate logical device 152 is read as the copy source logical device. Then, the copy source logical device 151 and the intermediate logical device 152 are made to have correspondence with the physical device and the external device, respectively. This brings the copy source logical device 151 and the intermediate logical device 152 in the same condition as that at the timing when the step S33 has completed in the first embodiment. Further, while changing in the managing information in the step S33A, access to the copy source logical device 151 and the intermediate logical device 152 from the host computer 3 is temporally suspended. This keeps consistency in data between the intermediate logical device 152 and the copy source logical device 151.

The present invention is not limited to the embodiments mentioned above. The structure of the storage apparatus 1, the data structure, and the processes can be modified without departure from the sprit of the present invention. For example, the system has been described with the case where one storage apparatus 1 is used. However, the system may be configured with a plurality of storage apparatuses.

In the above-described embodiments, the control units of the storage apparatuses 1 and 6 may cause the service devices 16 at first and second sites to display information of the logical device in the external storage apparatus 4 on displays thereof, respectively.

The first site may be isolated and remote from an area where disaster occurs around the second site.

The invention claimed is:

1. An initial copy system for remote copy, comprising:
 a plurality of computer systems at a plurality of sites, each of said computer systems includes external devices and storage apparatuses coupled to the external devices, respectively, the storage apparatuses at the plurality of sites being coupled to each other through a communication network,
 wherein data in a first storage apparatus of the storage apparatuses at a first site of the sites being remotely copied into a second storage apparatus of the storage apparatuses at a second site of the sites; and
 a third storage apparatus, initially connected to the first storage apparatus at the first site, which is subsequently disconnected from the first storage apparatus and then moved to the second site so as to be connected to the second storage apparatus at the second site, said third storage apparatus being an external storage apparatus with respect to the first and second storage apparatus,
 wherein the first, second and third storage apparatuses each comprises a logical device formed by a plurality of disk drives, external device managing information for defining a configuration of an external storage device, and a control unit,
 wherein the control unit of the first storage apparatus generates a snapshot of the logical device of the first storage apparatus in the logical device of the third storage apparatus and recognizes the logical device in the third storage apparatus as the logical device of the third storage apparatus,
 wherein the control unit in the first storage apparatus generates and manages a bit map indicating difference data between copy target data derived from the snapshot and updated data of copy target data and updates the external device managing information in the first storage apparatus, when the third storage apparatus is disconnected from the first storage apparatus, said third storage apparatus is then subsequently moved to the second site and connected to said second storage apparatus at the second site,
 wherein the control unit in the second storage apparatus recognizes the logical device in the third storage apparatus as a copy target of a remote copy and updates the external device managing information in the second storage apparatus, when the third storage apparatus is connected to the second storage apparatus at the second site after having been disconnected from the first storage apparatus at the first site and moved to the second site so as to be connected to the second storage apparatus at the second site, and
 wherein the control unit of the first storage apparatus controls writing performed by the control unit, of the second storage apparatus on the difference data in the bit map transmitted through the communication network in the logical device recognized by the second storage apparatus so as to accord the data in the second storage apparatus with the data in the first storage apparatus.

2. The initial copy system as claimed in claim 1, wherein when the third storage apparatus is disconnected from the first storage apparatus at the first site, the control unit in the first storage apparatus updates the copy target data and manages the update data of the copy target data, in response to a request from the external device.

3. The initial copy system as claimed in claim 1, wherein when instructing the second storage apparatus about writing in a logical device recognized by the second storage apparatus, the control unit of the first storage apparatus copies the managed bit map in another bit map and instructs the writing based on the difference data in a copied bit map.

4. The initial copy system as claimed in claim 1, wherein the bit map manages the logical device of the first storage apparatus at a unit of a block, and when instructing the second storage apparatus about writing, the control unit instructs the second storage apparatus about writing every block indicating the difference data.

5. The initial copy system as claimed in claim 4, wherein when receiving an instruction about the writing from the first storage apparatus, the control unit of the second storage apparatus performs the writing and reports a result of the writing to the first storage apparatus.

6. The initial copy system as claimed in claim 1, wherein the control units of the first and second storage apparatuses cause the external devices at first and second sites to display information of the logical device in the third storage apparatus on displays thereof, respectively.

7. The initial copy system as claimed in claim 1, wherein the control unit of the first storage apparatus assigns a snapshot pair number to the logical device of a source of copy of the snapshot and the logical device of a target of copy of the snapshot for management.

8. The initial copy system as claimed in claim 1, wherein the control unit of the first storage apparatus assigns a remote pair number to the logical device of a source of copy of the snapshot and the logical device of a target of copy of the snapshot for management.

9. An initial copy method for remote copying, wherein a plurality of computer systems are installed at a plurality of sites respectively, each of the computer systems including an external device and a storage apparatus coupled to the external device, the storage apparatuses at the plurality of sites being coupled to each other through a communication network, data in a first storage apparatus of the storage apparatuses at a first site of the sites being remotely copied into a second storage apparatus of the storage apparatuses at a second site of the sites, the method comprising the steps of:
wherein the first, second and a third storage apparatuses each comprises a logical device formed by a plurality of disk drives, external device managing information for defining a configuration of an external storage device, and a control unit,
in the control unit in the first storage apparatus at the first site, generating a snapshot of the logical device in the first storage apparatus in the third storage apparatus and recognizing the logical device in the third storage apparatus at first storage apparatus at the first site,
wherein the third storage apparatus, being initially connected to the first storage apparatus at the first site, is subsequently disconnected from the first storage apparatus and then moved to the second site so as to be connected to the second storage apparatus at the second site, said third storage apparatus being an external storage apparatus with respect to the first and second storage apparatuses,
in the control unit in the first storage apparatus at the first site, generating and managing a bit map indicating difference data between copy target data derived from the snapshot and updated data of copy target data and updating the external device managing information in the first storage apparatus, when the third storage apparatus is disconnected from the first storage apparatus and said third storage apparatus is subsequently moved to the second site and connected to said second storage apparatus at the second site,
in the control unit in the second storage apparatus at the second site, recognizing the logical device in the third storage apparatus as a copy target of a remote copy and updating the external device managing information in the second storage apparatus, when the third storage apparatus is connected to the second storage apparatus at the second site after having been disconnected from the first storage apparatus at the first site and moved to the second site so as to be connected to the second storage apparatus at the second site, and
in the control unit in the first storage apparatus at the first site, controlling writing performed by the control unit of the second storage apparatus based on the difference data in a bit map transmitted through the communication network in the logical device recognized by the second storage apparatus so as to accord the data in the second storage apparatus with the data in the first storage apparatus.

10. The initial copy method as claimed in claim 9, further comprising the steps of:
when the third storage apparatus is disconnected, in the control unit of the first storage apparatus, updating the copy target and managing the update data of the target of the copy, in response to a request from the external device.

11. The initial copy method as claimed in claim 9, wherein the step of instructing the control unit of the second storage apparatus about writing in the logical device recognized by the second storage apparatus comprises copying the managed bit map in another bit map and instructing the writing on the basis of the difference data in the copied bit map.

12. The initial copy method as claimed in claim 9, wherein the bit map manages the logical device of the first storage apparatus at a unit of a block, and when instructing the second storage apparatus about writing, the control unit of the first storage apparatus instructs the second storage apparatus about writing every block indicating the difference data.

13. The initial copy method as claimed in claim 12, further comprising the steps of:
whenever the control unit of the second storage apparatus receives instruction about the writing from the first storage apparatus, in the control unit of the second storage apparatus, performing the writing and reporting a result of the writing to the first storage apparatus.

14. The initial copy method as claimed in claim 9, further comprising the step of:
in the control unit of the first storage apparatus, assigning a snapshot pair number to the logical device of the source of copy of the snapshot and the logical device of the target of copy of the snapshot for management.

15. The initial copy method as claimed in claim 9, further comprising the step of:
in the control unit of the first storage apparatus, assigning a remote copy pair number to the logical device of the source of copy of the snapshot and the logical device of the target of remote copy for management.

16. A storage apparatus at a site comprising:
a logical device configured with a plurality of disk drives;
external device managing information for defining a configuration of an external storage device; and
a control unit, wherein the control unit generates a snapshot of the logical device of the storage apparatus in a logical device in an external storage apparatus independently connected to the storage apparatus at the site, recognizes the logical device in the external storage apparatus as the logical device assigned to the external storage apparatus, manages difference data between copy target data derived from the snapshot and updated data of copy target data, and updates the external device managing information, when the external storage apparatus is disconnected from the storage apparatus, moved to another site and connected to another storage apparatus at the another site, wherein the control unit controls writing performed by the control unit of the another storage apparatus in the logical device of the copy target based on the difference data in the bit map transmitted through the communication network in the logical device of a target of copy so as to accord the data in the another storage apparatus with the data in the storage apparatus after the external storage apparatus storing the snapshot is disconnected from the storage apparatus at the site, moved to the another site and connected to the another storage apparatus at the another site, the logical device of the external storage apparatus is recognized as a logical device of a copy target, and the external device managing information in the another storage apparatus is updated.

17. The storage apparatus as claimed in claim 16, wherein when the external storage apparatus is disconnected, the control unit updates the copy target data derived from the snapshot and manages the update data of the target of the copy, in response to a request from the external device.

18. The storage apparatus as claimed in claim 16, wherein when instructing about writing in the logical device of a copy target, the control unit copies the managed bit map in another bit map and instructs the writing on the basis of the difference data in the copied bit map.

19. The storage apparatus as claimed in claim 16, wherein the bit map manages the logical device of the first storage apparatus at a unit of a block and when instructing the writing in a logical device of the copy target, the control unit instructs the storage apparatus in the site about the writing every block indicating difference data output of the bit map block to the external storage apparatus.

20. The storage apparatus as claimed in claim 16, wherein whenever receiving the instruction about the writing, the control unit receives a completion report from the storage apparatus at another site.

* * * * *